US011538202B2

(12) United States Patent
Cervelli et al.

(10) Patent No.: US 11,538,202 B2
(45) Date of Patent: Dec. 27, 2022

(54) TIME-SERIES ANALYSIS SYSTEM

(71) Applicant: Palantir Technologies Inc., Denver, CO (US)

(72) Inventors: Daniel Cervelli, Mountain View, CA (US); David Skiff, Redwood City, CA (US); David Tobin, Atherton, CA (US); Allen Cai, Menlo Park, CA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 17/229,715

(22) Filed: Apr. 13, 2021

(65) Prior Publication Data

US 2021/0304467 A1 Sep. 30, 2021

Related U.S. Application Data

(63) Continuation of application No. 16/443,626, filed on Jun. 17, 2019, now Pat. No. 11,004,244, which is a
(Continued)

(51) Int. Cl.
*G06T 11/20* (2006.01)
*G06F 16/2458* (2019.01)
(Continued)

(52) U.S. Cl.
CPC .......... *G06T 11/206* (2013.01); *G06F 3/0482* (2013.01); *G06F 3/04842* (2013.01);
(Continued)

(58) Field of Classification Search
CPC ............................ G06T 11/206; G06F 3/0482
See application file for complete search history.

(56) References Cited

U.S. PATENT DOCUMENTS 6,102,136 A * 8/2000 Archambeault ......... G01V 3/08
175/45
6,547,831 B1 4/2003 Kueny
(Continued)

OTHER PUBLICATIONS

U.S. Appl. No. 15/930,996, Data Aggregation and Analysis System, filed May 13, 2020.
(Continued)

*Primary Examiner* — Michelle L Sams
(74) *Attorney, Agent, or Firm* — Knobbe Martens Olson & Bear LLP

(57) ABSTRACT

Various systems and methods are provided that display various graphs in an interactive user interface in substantially real-time in response to input from a user in order to determine information related to measured data points and provide the determined information to the user in the interactive user interface. For example, a computing device may be configured to retrieve data from one or more databases and generate one or more interactive user interfaces. The one or more interactive user interfaces may display the retrieved data in one or more graphs, such as time-series or scatterplots. The user interface may be interactive in that a user may manipulate one graph, which causes an identical or nearly identical manipulation of another displayed graph in real-time. The manipulations may occur even if the displayed graphs include data across different time ranges.

20 Claims, 36 Drawing Sheets

Related U.S. Application Data continuation of application No. 15/354,868, filed on Nov. 17, 2016, now Pat. No. 10,360,702, which is a continuation of application No. 14/871,465, filed on Sep. 30, 2015, now Pat. No. 9,501,851.

(60) Provisional application No. 62/206,159, filed on Aug. 17, 2015, provisional application No. 62/059,601, filed on Oct. 3, 2014.

(51) Int. Cl.
  *G06F 3/04842* (2022.01)
  *G06F 3/04847* (2022.01)
  *G06F 3/0482* (2013.01)
  *G06F 3/04845* (2022.01)

(52) U.S. Cl.
  CPC ...... *G06F 3/04845* (2013.01); *G06F 3/04847* (2013.01); *G06F 16/2477* (2019.01); *G06F 2203/04806* (2013.01)

(56) References Cited

U.S. PATENT DOCUMENTS

| | | |
|---|---|---|
| 7,265,755 B2 | 9/2007 | Peterson |
| 7,308,643 B1 | 12/2007 | Zhu et al. |
| 7,769,742 B1 | 8/2010 | Brawer et al. |
| 7,987,172 B1 | 7/2011 | Carver |
| 8,112,426 B2 | 2/2012 | Acharya et al. |
| 8,676,783 B1 | 3/2014 | Fedorynski et al. |
| 8,924,399 B1 | 12/2014 | Roberts et al. |
| 8,959,433 B2 | 2/2015 | Schubert |
| 9,501,851 B2 | 11/2016 | Cervelli et al. |
| 9,767,172 B2 | 9/2017 | Fackler et al. |
| 10,360,702 B2 | 7/2019 | Cervelli et al. |
| 10,664,362 B2 | 5/2020 | Larson et al. |
| 10,664,490 B2 | 5/2020 | Fackler et al. |
| 10,853,438 B1 | 12/2020 | Spillane et al. |
| 11,004,244 B2 | 5/2021 | Cervelli et al. |
| 2003/0088421 A1 | 5/2003 | Maes et al. |
| 2003/0131048 A1 | 7/2003 | Najork |
| 2006/0156228 A1 | 7/2006 | Gallo et al. |
| 2007/0198907 A1 | 8/2007 | Degala et al. |
| 2007/0298773 A1 | 12/2007 | Uematsu et al. |
| 2008/0278495 A1 | 11/2008 | Minamide et al. |
| 2009/0030876 A1 | 1/2009 | Hamilton |
| 2009/0031220 A1 | 1/2009 | Tranchant et al. |
| 2009/0100322 A1 | 4/2009 | Phillips |
| 2010/0299347 A1 | 11/2010 | Greenberg et al. |
| 2010/0325440 A1 | 12/2010 | Deutschmann et al. |
| 2012/0047180 A1 | 2/2012 | Kirshenbaum |
| 2014/0038513 A1 | 2/2014 | Gotoh et al. |
| 2014/0237338 A1 | 8/2014 | Hu et al. |
| 2014/0249999 A1 | 9/2014 | Johnson et al. |
| 2014/0316706 A1* | 10/2014 | Grant .................. G01V 1/362 702/11 |
| 2014/0351261 A1 | 11/2014 | Aswani et al. |
| 2015/0381515 A1 | 12/2015 | Mattson et al. |
| 2016/0291959 A1 | 10/2016 | Searle et al. |
| 2020/0272634 A1 | 8/2020 | Fackler et al. |

OTHER PUBLICATIONS

Quarksoft.com, Tech Tip: Using URL Parameters to Pre-Fill Form Fields, Mar. 26, 2013, 2 pages.

\* cited by examiner

WELL #1 1010

WELL #1
Producer 1020

| | |
|---|---|
| Spud Date: | March 1, 2000 12:00:00 -00:00 |
| Completion Date: | August 2, 2000 16:35:00 -00:00 |
| Water Depth: | 100m |
| Well Length: | 10m |
| True Vertical Depth: | 160m |
| | |
| Region: | West |
| Field: | Chamber |
| Platform: | Jane |
| Block: | 5 |
| Slot: | 12 |
| | |
| Objectives: | To start production |

Profile
Well Communication
Map
Sens
Oil/Gas/Water
History and Events
Well Work
Comments
CPI
Comp. Diagram

TIME-SERIES ANALYSIS SYSTEM

CROSS-REFERENCE TO RELATED APPLICATIONS

This application is a continuation of U.S. patent application Ser. No. 16/443,626, filed on Jun. 17, 2019, entitled "TIME-SERIES ANALYSIS SYSTEM," which is a continuation of U.S. patent application Ser. No. 15/354,868, filed on Nov. 17, 2016, entitled "TIME-SERIES ANALYSIS SYSTEM," which is a continuation of U.S. patent application Ser. No. 14/871,465, filed on Sep. 30, 2015, entitled "TIME-SERIES ANALYSIS SYSTEM," which claims priority under 35 U.S.C. § 119(e) to U.S. Provisional Application No. 62/059,601, entitled "CHRONICLE TIME-SERIES ANALYSIS SYSTEM" and filed on Oct. 3, 2014, and U.S. Provisional Application No. 62/206,159, entitled "TIME-SERIES ANALYSIS SYSTEM" and filed on Aug. 17, 2015, which are hereby incorporated by reference in their entireties.

TECHNICAL FIELD

The present disclosure relates to systems and techniques for querying databases and displaying queried data in an interactive user interface.

BACKGROUND

A database may store a large quantity of data. For example, a system may comprise a large number of sensors that each collect measurements at regular intervals, and the measurements may be stored in the database and/or a system of databases. The measurement data can be supplemented with other data, such as information regarding events that occurred while the system was operational, and the supplemental data can also be stored in the database and/or the system of databases.

In some cases, a user may attempt to analyze a portion of the stored data. For example, the user may attempt to analyze a portion of the stored data that is associated with a specific time period. However, as the number of measurements increases over time, it can become very difficult for the user to identify the relevant data and perform the analysis.

SUMMARY

The systems, methods, and devices described herein each have several aspects, no single one of which is solely responsible for its desirable attributes. Without limiting the scope of this disclosure, several non-limiting features will now be discussed briefly.

Disclosed herein are various systems and methods for displaying various graphs in an interactive user interface in substantially real-time in response to input from a user in order to determine information related to measured data points and provide the determined information to the user in the interactive user interface. For example, a computing device may be configured to retrieve data from one or more databases and generate one or more interactive user interfaces. The one or more interactive user interfaces may display the retrieved data in one or more graphs, such as time-series or scatterplots. The user interface may be interactive in that a user may manipulate one graph, which causes an identical or nearly identical manipulation of another displayed graph in real-time. The manipulations may occur even if the displayed graphs include data across different time ranges. The user interface may also be interactive in that a user may select a portion of a graph (e.g., data across a certain time period) to view tangential data related to the selection (e.g., events that occurred during a time period represented by the selection).

The various systems described herein may maximize or enhance the speed and accuracy of data displayed in user interfaces using zoom level specific caching. For example, depending on a zoom level of data displayed, individual pixels represent different time ranges (e.g., 1 day in February, 1 week in February, 1 month in 2014, etc.). Over the time range of an individual pixel, the computing system may determine a maximum value and a minimum value of the data to be displayed in the graph. The determined minimum and maximum values may then be cached, such that they are available in the future when that same zoom level is requested by the user or other users, saving the system from recalculation of the same minimum and maximum value to include on the chart (possibly from multiple data points at each pixel time range). For each individual pixel, a line may be rendered from the maximum value to the minimum value. If the granularity of the measured data matches the time range of an individual pixel, then the maximum value and the minimum value may be the same. In one embodiment, the computing system may display the graph at the closest zoom level at which maximum and minimum values have been cached to ensure that the cached data can be used effectively.

One aspect of the disclosure provides a computing system configured to access one or more databases in substantially real-time in response to input from a user provided in an interactive user interface in order to determine information related to measured data points and provide the determined information to the user in the interactive user interface. The computing system comprises a computer processor. The computing system further comprises a database storing at least first sensor values for a first sensor at each of a plurality of times and second sensor values for a second sensor at each of a plurality of times. The computing system further comprises a computer readable storage medium storing program instructions configured for execution by the computer processor in order to cause the computing system to generate user interface data for rendering the interactive user interface on a computing device, the interactive user interface including a first container and a second container, where the first container includes a first graph and the second container includes a second graph, where the first container and the second container have a same width, where the first graph includes first sensor values for the first sensor over a first time period and the second graph includes second sensor values for the second sensor over a second time period that is shorter than the first time period, and wherein portions of the first graph and the second graph are each selectable by the user; receive an identification of a selection by the user of a first data point in the first graph, where the first data point corresponds to a first time range; update the user interface data such that the interactive user interface includes a first marker at a location of the first data point in the first graph; access the database to determine a second sensor value that corresponds to a beginning of the first time range and a second sensor value that corresponds to an end of the first time range; and update the user interface data to include a second marker at a location of a second data point in the second graph that corresponds to the beginning of the first time range and a third marker at a location of a third data point in the second graph that corresponds to the end of the first time range.

The computing system of the preceding paragraph can have any sub-combination of the following features: where the instructions are further configured to cause the computing system to: receive an indication from the user of a change to the first time period in the first graph, in response to receiving the indication from the user of the change to the first time period, adjust positions of the first and second markers indicating the first time period in the second graph; where the computer readable storage medium further stores program instructions that cause the computing system to update the user interface data to include a third container, where the third container includes a list of events that occurred within the first time range; where the first graph, for each event that occurred within the first time range, includes a mark that indicates a data point on the first graph that corresponds with a time that the respective event occurred; where the computer readable storage medium further stores program instructions that cause the computing system to update the user interface data to include a marker at a location in the first graph corresponding to a first event in the list of events in response to selection by the user of a location in the third container that corresponds to the first event; where the computer readable storage medium further stores program instructions that cause the computing system to: receive an indication by the user of a selection in the first graph at a fourth data point such that a new event is added at a time that corresponds with the fourth data point, and update the user interface data such that the third container includes an identification of the new event; where the computer readable storage medium further stores program instructions that cause the computing system to: receive an indication by the user that the new event corresponds with the first graph, and update the user interface data such that a first mark is displayed in the first graph at the time that corresponds with the fourth data point; where the computer readable storage medium further stores program instructions that cause the computing system to: receive an indication by the user that the new event corresponds with the second graph, and update the user interface data such that a first mark is displayed in the second graph at the time that corresponds with the fourth data point; where the computer readable storage medium further stores program instructions that cause the computing system to: receive an indication by the user that the new event corresponds with the first graph and the second graph, and update the user interface data such that a first mark is displayed in the first graph at the time that corresponds with the fourth data point and in the second graph at the time that corresponds with the fourth data point; where the computer readable storage medium further stores program instructions that cause the computing system to: receive an indication of selection by the user of a first event in the list of events, and update the user interface data such that the first graph includes an icon at a position of a data point in the first graph that corresponds with the first event; where the computer readable storage medium further stores program instructions that cause the computing system to: receive an indication of selection, by the user, of a first location corresponding to the first time in the first graph, and update the user interface data such that the first graph includes a marker at the location in the first graph corresponding to the first time; where the computer readable storage medium further stores program instructions that cause the computing system to update the user interface data such that the second graph includes a second marker at a location in the second graph corresponding to the first time; where the computer readable storage medium further stores program instructions that cause the computing system to: receive an indication of selection, by the user of a second location corresponding to a second time in the first graph, and update the user interface data such that the first graph includes the marker at the second location in the first graph corresponding to the second time; where the computer readable storage medium further stores program instructions that cause the computing system to update the user interface data such that the second graph includes the second marker at a location in the second graph corresponding to the second time; where the first data point comprises a line from a location in the first graph that corresponds with a highest value measured by the first sensor during the first time range to a location in the first graph that corresponds with a lowest value measured by the first sensor during the first time range; where the computer readable storage medium further stores program instructions that cause the computing system to receive an indication that a zoom level of the first graph is adjusted from a first zoom level to a second zoom level; where the computer readable storage medium further stores program instructions that cause the computing system to retrieve, from a cache, for a second time range that corresponds to a first pixel in an x-axis of the first graph, a highest value measured by the first sensor during the second time range and a lowest value measured by the first sensor during the second time range; where the computer readable storage medium further stores program instructions that cause the computing system to update the user interface data such that the first graph includes a line from a location in the first graph that corresponds with the highest value to a location in the first graph that corresponds with the lowest value; where the first sensor and the second sensor are oil well sensors; and where the first sensor values correspond to oil extracted from an oil well, and where the second sensor values correspond to water extracted from the oil well.

The present disclosure also comprises a computer program product, for example a non-transitory or transitory computer-readable medium, that comprises the program instructions recited in any of the appended claims, and/or comprises the program instructions disclosed in the present description. The present disclosure further comprises a method in which the steps recited in any of the appended claims, and/or the steps disclosed in the present description, are executed by one or more computing devices.

BRIEF DESCRIPTION OF THE DRAWINGS

FIGS. 11A-D illustrate another user interface that displays interactive information about an oil well.

DETAILED DESCRIPTION OF SPECIFIC EMBODIMENTS

Overview

Figure 1:
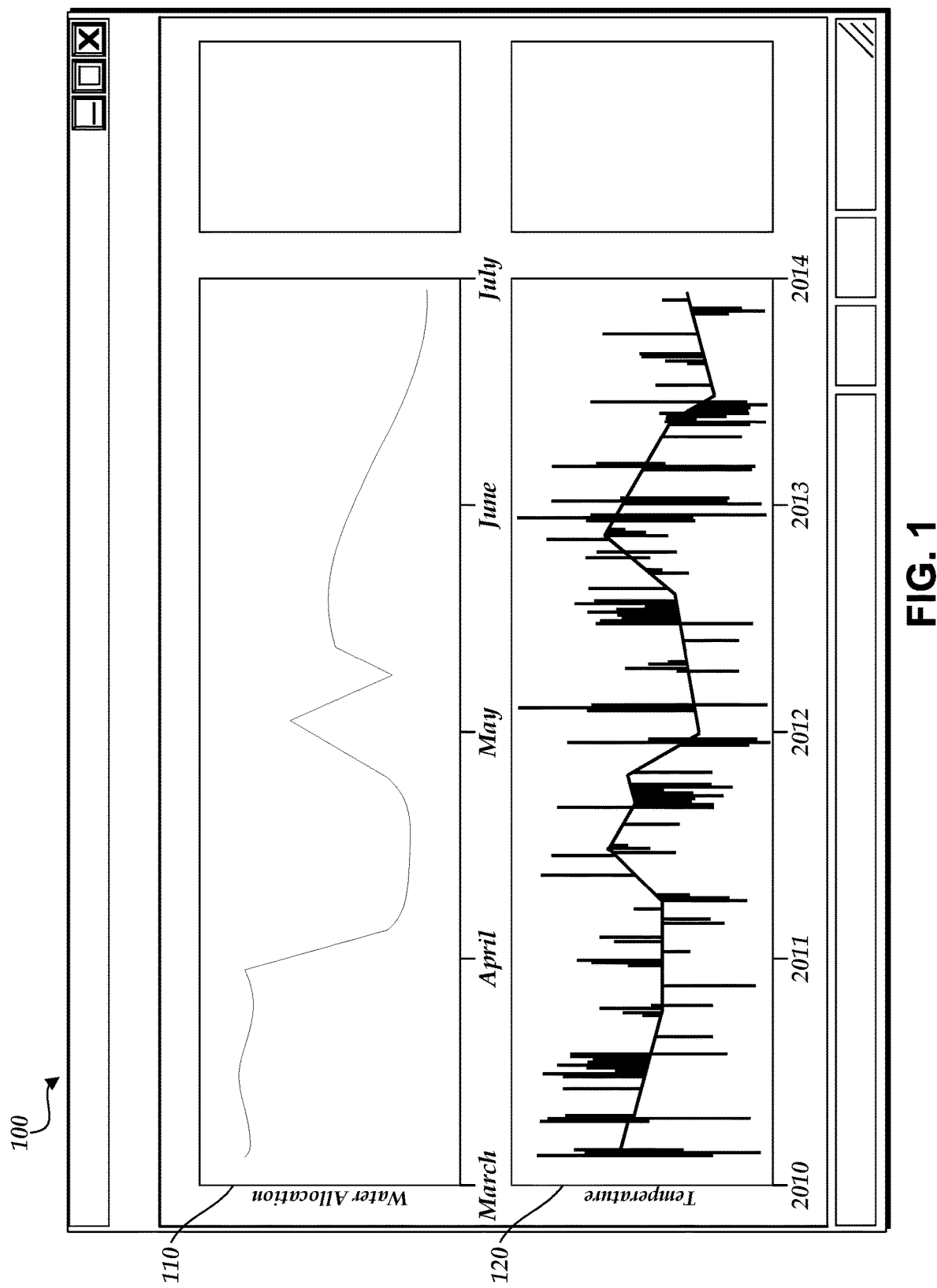
FIG. 1 illustrates a user interface that displays a first time-series graph and a second time-series graph.

As described above, it can become very difficult for the user to identify relevant data and perform an analysis when a database and/or a system of databases includes a large amount of data. This may be especially true if the user would like to compare two or more data sets over a specific period of time, where the data sets correspond to measurements taken by sensors in a system. In conventional systems, user interfaces may be generated that allow the user to view graphs of the data sets. However, it may be difficult or burdensome for the user to try to identify trends in the data and/or determine the reasons why a sensor acted in a given manner.

Accordingly, disclosed herein are various systems and methods for displaying various graphs in an interactive user interface. For example, a computing device (e.g., the computing system 1400 of FIG. 14 described below) may be configured to retrieve data from one or more databases and generate one or more interactive user interfaces. The one or more interactive user interfaces may display the retrieved data in one or more graphs, such as time-series or scatterplots. The user interface may be interactive in that a user may manipulate one graph, which causes an identical or nearly identical manipulation of another displayed graph in real-time. The manipulations may occur even if the displayed graphs include data across different time ranges. The user interface may also be interactive in that a user may select a portion of a graph (e.g., data across a certain time period) to view tangential data related to the selection (e.g., events that occurred during a time period represented by the selection).

The data in the graphs may be rendered in the interactive user interfaces according to a technique that efficiently uses the pixels that are available for displaying the graphs. For example, every individual pixel (in the x-axis of an x-y graph) may represent a time range (e.g., 1 day in February, 1 week in February, 1 month in 2014, etc.). Over the time range of an individual pixel, the computing system may determine a maximum value and a minimum value of the data to be displayed in the graph. If the granularity of the measured data matches the time range of an individual pixel (e.g., an individual pixel represents a time range of 1 hour and data was measured every hour), then the maximum value and the minimum value may be the same. For each individual pixel (in the x-axis), a line may be rendered from the maximum value to the minimum value (in the y-axis).

As described above, the graphs may be manipulated by the user. For example, the user may zoom into a portion of a graph. In an embodiment, the computing system predetermines each possible zoom level (or at least most commonly used zoom levels) and pre-calculates the maximum and minimum values for time periods associated with the minimum display resolution (e.g., each individual pixel in the x-axis may be associated with a time period) at separate possible zoom level. These pre-calculated maximum and minimum values may be cached, such that they may be retrieved as a user adjusts zoom levels in order to more rapidly update the graph to include the most granular data available at the particular zoom level. In one embodiment, if the user selects a zoom level having minimum time periods per pixel (or some other display unit) that has not been pre-cached, the computing system may display the graph at the closest zoom level at which maximum and minimum values have been cached to ensure that the cached data can be used effectively.

In some embodiments, the interactive user interfaces may include information about a system and sensors associated with the system. For example, the interactive user interfaces may include time-series graphs that display data measured by sensors associated with an oil well. The time-series (and/or any other graphs displayed in the user interface) may be manipulated by the user in any manner as described herein. While the disclosure is described herein with respect to time-series data measured by sensors associated with an oil well, this is not meant to be limiting. The various graphs described herein can depict any time-series data measured by sensors, not just sensors associated with an oil well. For example, the various graphs described herein can depict time-series data measured by outdoor or indoor temperature sensors, humidity sensors, sensors that measure water levels, sensors that measure traffic congestion, sensors that detect seismic activity, and/or the like. Furthermore, the various graphs described herein can depict any type of time-series data, not just time-series data derived from a sensor. For example, the various graphs described herein can depict healthcare data (e.g., pharmaceutical batch failure data over time, the number of claims filed over time, etc.), financial data (e.g., the price of a stock over time), polling data (e.g., the number of respondents that view an issue favorably in polls conducted over a period of time), census information (e.g., the population of a city over time), and/or the like. The time-series data depicted in the graphs and derived from any source can be manipulated by the user in any manner as described herein.

The systems and methods described herein may provide several benefits. For example, the systems and methods described herein may improve the usability of the user interface by providing graphs that can be manipulated by a user in a concurrent manner, thereby allowing the user to identify trends or other information associated with the graphs without having to separately manipulate each individual graph. As another example, the systems and methods described herein may reduce the processor load while the user is interacting with the user interfaces by predetermining each possible zoom level and pre-calculating the maximum and minimum values. The systems and methods described herein may also increase the processing speed as the computing system may not have to determine in real-time how a graph should be updated when the zoom level is changed. Rather, the computing system can retrieve the appropriate data from the cache to update the graph. As another example, the systems and methods described herein may reduce the latency in generating updated user interfaces as the zoom levels and maximum and minimum values may be predetermined and can be retrieved from cache rather than the databases that store the actual data (e.g., which could be located externally from the computing system). Thus, the systems and methods described herein may improve the usability of the user interface.

Examples of Manipulating Time-Series Graphs in an Interactive User Interface

FIG. 1 illustrates a user interface 100 that displays a time-series graph 110 and a time-series graph 120. As illustrated in FIG. 1, the time-series graph 110 plots water allocation data across several months. The time-series graph 120 plots temperature data across several years. While the time-series graph 110 and the time-series graph 120 are each illustrated as plotting a single type of data, this is merely for simplicity and not meant to be limiting. The time-series graph 110 and/or the time-series graph 120 can plot multiple types of data simultaneously. For example, the time-series graph 110 can plot both water allocation data across several months and bottomhole pressure data for the same time period. The depicting of the plotted data can be varied to distinguish between the different types of data plotted in a single time-series graph. The time-series graph 110 and/or 120 plots may be resized vertically, horizontally, diagonally, and/or the like. In an embodiment, not shown, the user interface 100 may include a button that, when selected, causes the computing system that generates the user interface 100 to request current or updated data from an external source for display in the graph 110 and/or the graph 120. In some embodiments, the water allocation data and the temperature data are measured by sensors associated with the same system (e.g., an oil well).

In an embodiment, the water allocation data was measured at a granularity that matches each individual pixel in the x-axis of the time-series graph 110. Thus, the maximum and minimum values of the water allocation data at each individual pixel may be the same and a single point (the size of a pixel in the x and y direction) may represent each water allocation measurement.

The temperature data, however, may be measured at a granularity that does not match each individual pixel in the x-axis of the time-series graph 120. For example, the temperature may have been measured every day, yet each individual pixel may represent a 2 week time period. Thus, the computing system that generates the user interface 100 may calculate the maximum and minimum temperature values for each 2 week time period between the beginning and the end of the time range associated with the time-series graph 120 (e.g., 2010 to 2014). For each individual pixel in the x-axis of the time-series graph 120, a line may be rendered from the maximum temperature value to the minimum temperature value.

Figure 2A:
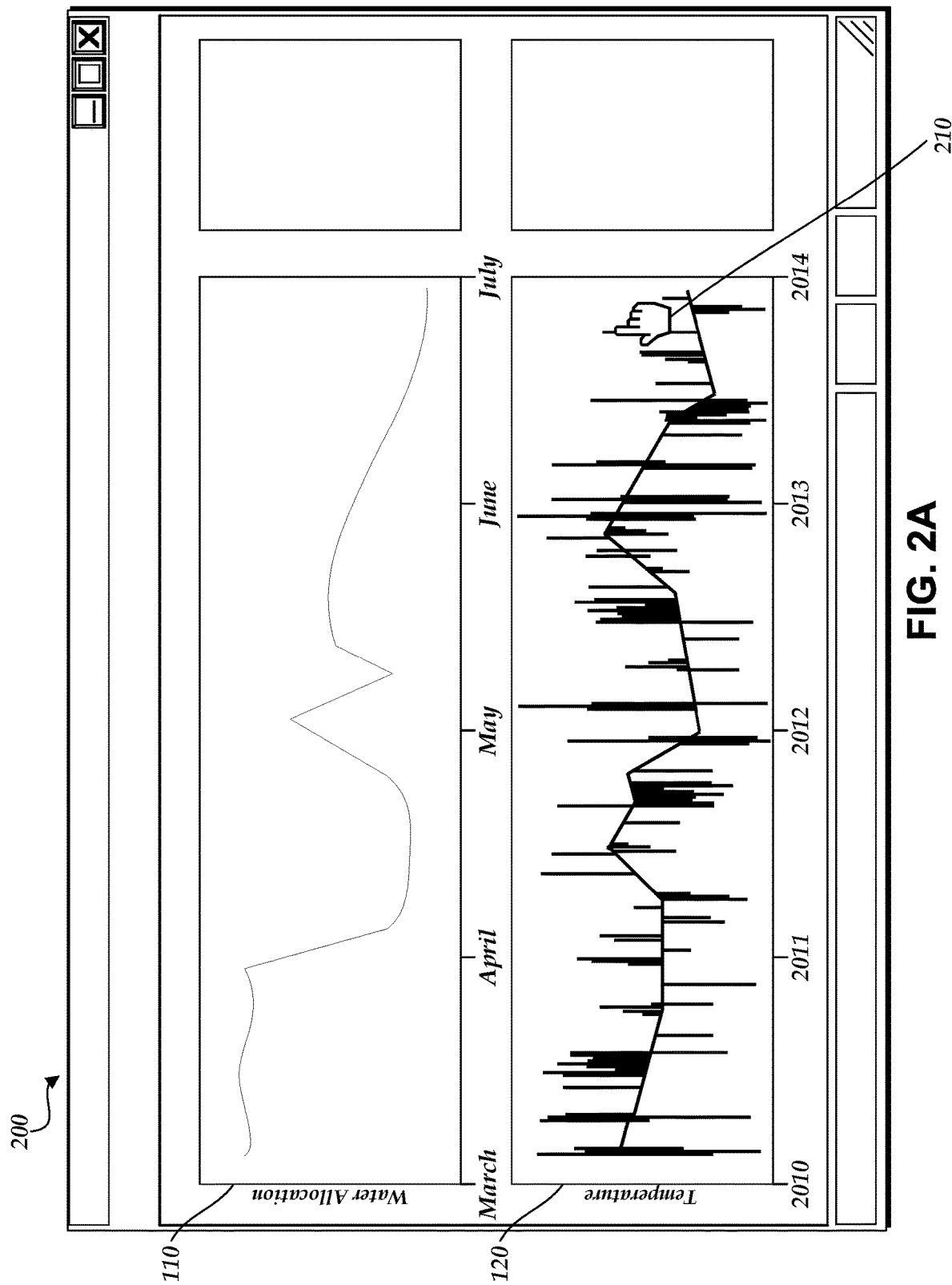
FIGS. 2A-B illustrate another user interface that displays the first time-series graph and the second time-series graph of FIG. 1.
Figure 2B:
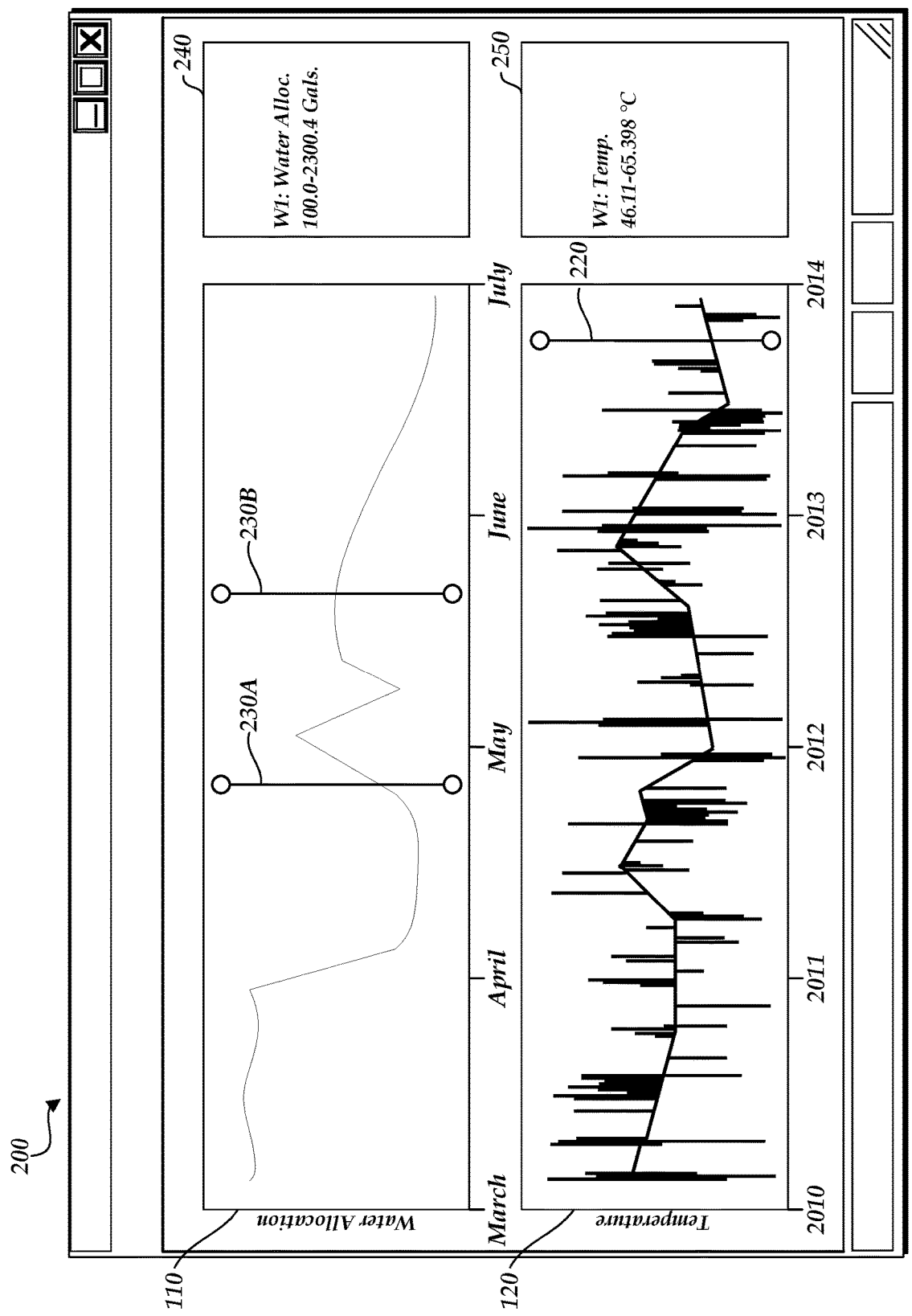

FIGS. 2A-2B illustrate another user interface 200 that displays the time-series graph 110 and the time-series graph 120. As illustrated in FIG. 2A, a user may place a cursor 210 (e.g., a mouse pointer, a finger, etc.) over a portion of the time-series graph 120. For example, the user may select the portion of the time-series graph 120 at the location of the cursor 210. Because the temperature data may be measured at a granularity that does not match each individual pixel, the selected portion of the time-series graph 120 may correspond to a first time period (e.g., 1 month in the year 2013). Thus, selection of the portion of the time-series graph 120 at the location of the cursor 210 may include selecting all temperature values within the first time period.

In an embodiment, selection of the portion of the time-series graph 120 at the location of the cursor 210 causes a marker 220 to appear at the selection in the time-series graph 120, as illustrated in FIG. 2B. Furthermore, the selection of the portion of the time-series graph 120 at the location of the cursor 210 may cause a corresponding selection to be made and displayed in the time-series graph 110, e.g., water allocation data recorded over a same time period as is represented by the marker 220 with reference to temperate data. For example, markers 230A and 230B may be displayed in the time-series graph 110. The selection in the time-series graph 110 may correspond to the selection in the time-series graph 120 in that the water allocation values between markers 230A and 230B may have been measured over the first time period (e.g., during the same month in 2013 selected by marker 220).

The user interface 200 may further include a window 240 where users can provide or view notes associated with a particular sensor data or with sensor data at a particular time or time period. In the example of FIG. 2B, the window 240 includes notes associated with both graphs 110 and 120 during the selected time period, but as discussed further below, the user can choose to have note information on only a single chart displayed. In some embodiments, the notes can include actual measurement data associated with the corresponding graph. For example, in the embodiment of FIG. 2B, the window 240 includes water allocation maximum and minimum data during the selected time period, while window 250 includes temperature data for the selected time period.

Figure 3A:
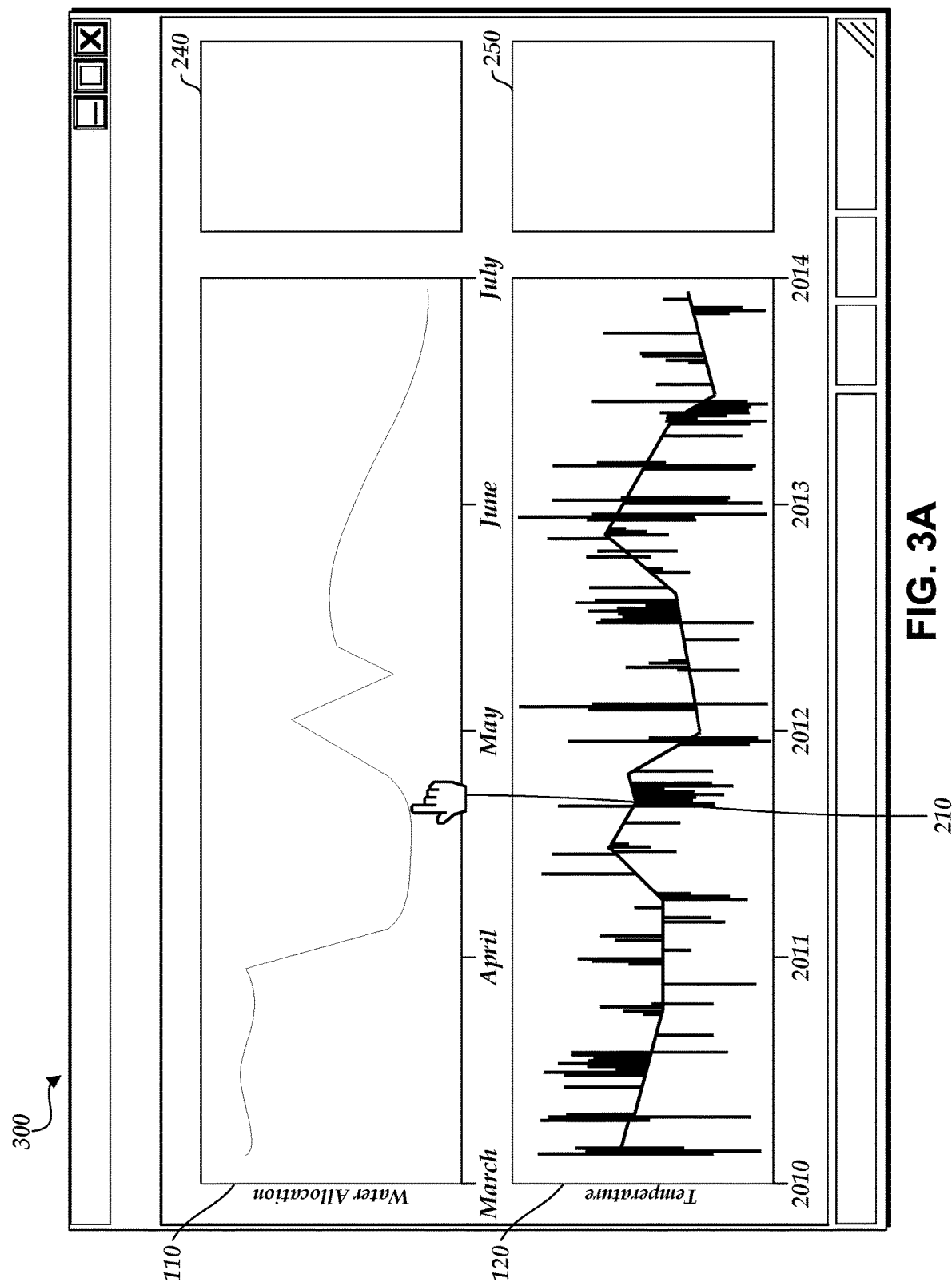
FIGS. 3A-3D illustrate another user interface that displays the first time-series graph and the second time-series graph of FIG. 1.
Figure 3B:
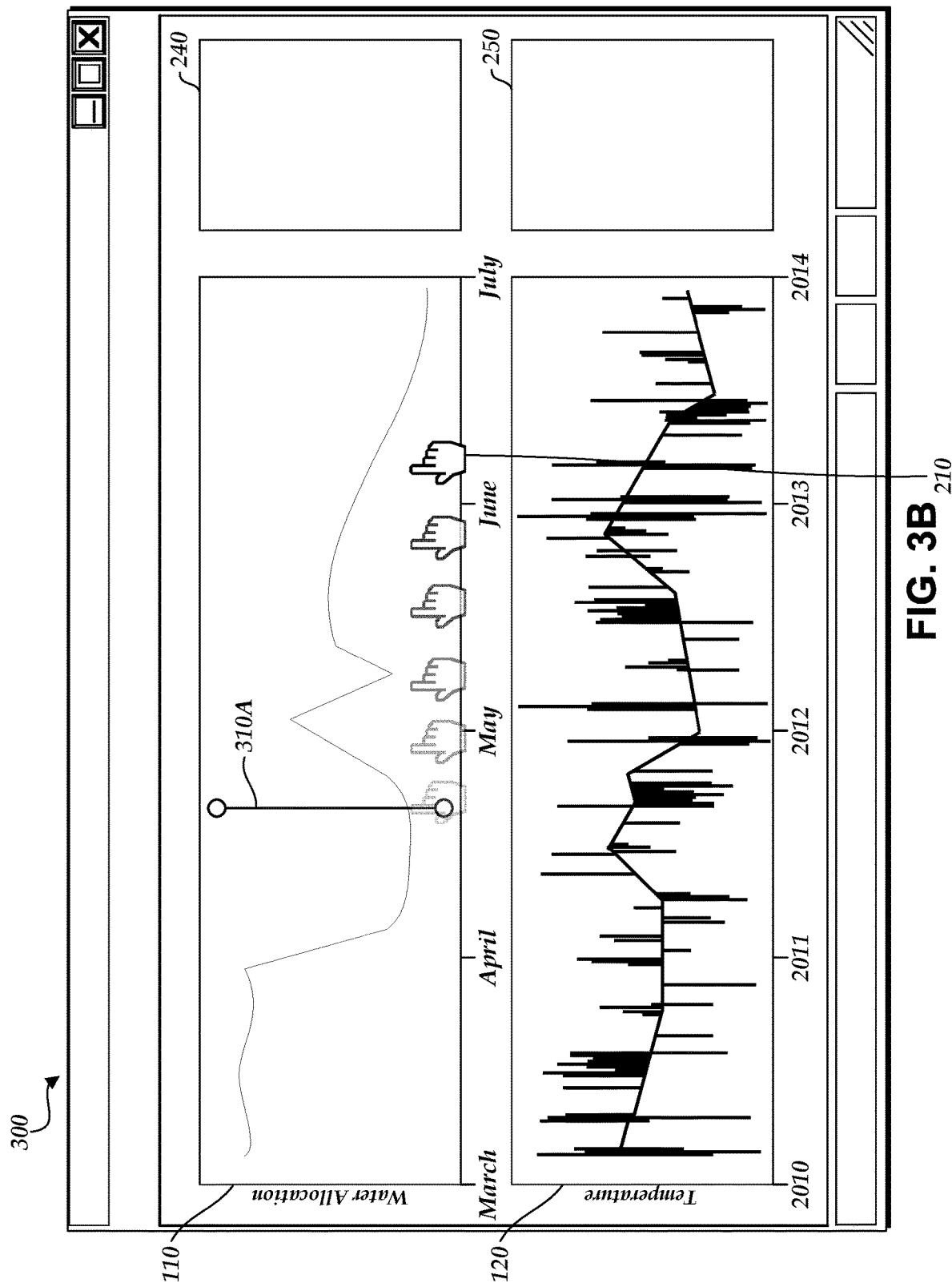
Figure 3C:
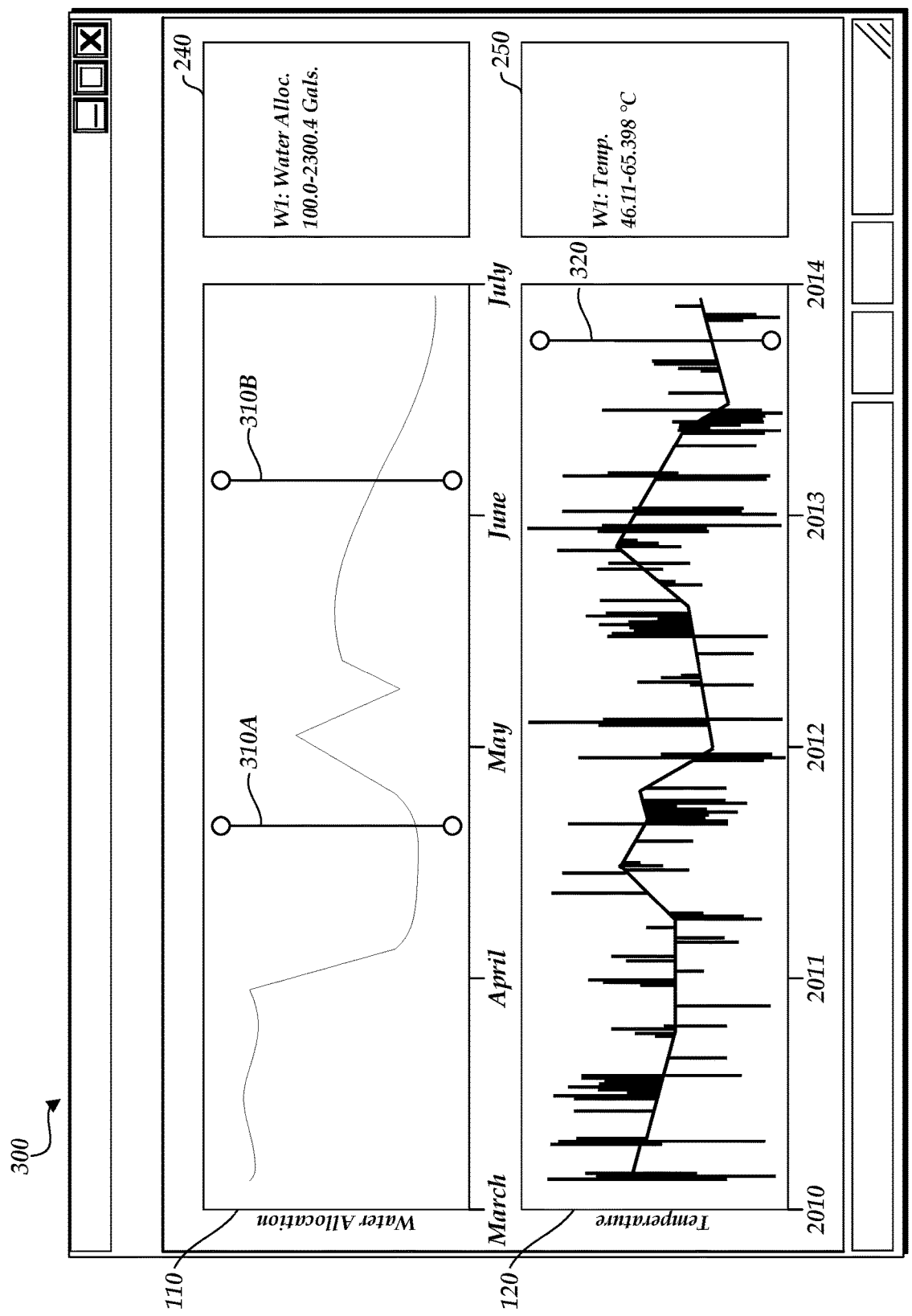

FIGS. 3A-3D illustrate another user interface 300 that displays the time-series graph 110 and the time-series graph 120. As illustrated in FIG. 3A, a user may place the cursor 210 over a portion of the time-series graph 110. For example, the user may begin to select a portion of the time-series graph 110 at the location of the cursor 210. As illustrated in FIG. 3B, the user may drag the cursor 210, while the time-series graph 110 is selected, from left to right to complete the selection at the new location of the cursor 210. As the user is dragging the cursor 210, a marker 310A may appear in the time-series graph 110 to indicate where the selection began.

In an embodiment, as the selection of the end of the desired time period is made in graph 110, a second marker 310B appears in the time-series graph 110 to indicate an end of the time period, and marker 320 (or possibly two markers showing start and end of the time period, if the scale of graph 120 is such that the time period includes multiple pixels) is updated in response to changes in the time period selected in graph 110 such that the markers in each graph 110 and 120 indicate the same time period, even though the time series graphs are on a different time scale. Thus, the selected time period in the time-series graph 110 with reference to water allocation is automatically used to select a corresponding time period in the time-series graph 120 with reference to temperature values.

The user may indicate that all graphs or just a subset of graphs displayed in the user interface 300 should be synchronized or identically manipulated in a manner described herein (e.g., an identical manipulation such as a selection of a time period in one graph causing a selection of a corresponding time period in another graph). For example, if the user interface 300 displayed a third graph, the user may be provided with an option to synchronize the graph 110, the graph 120, and the third graph, the graph 110 and the third graph, or the graph 120 and the third graph. If, for example, the user selected to synchronize the graph 120 and the third graph, then any changes to the third graph by the user may also occur to the graph 120, but not to the graph 110. Likewise, any changes to the graph 110 by the user would not affect the graph 120 or the third graph.

Figure 3D:
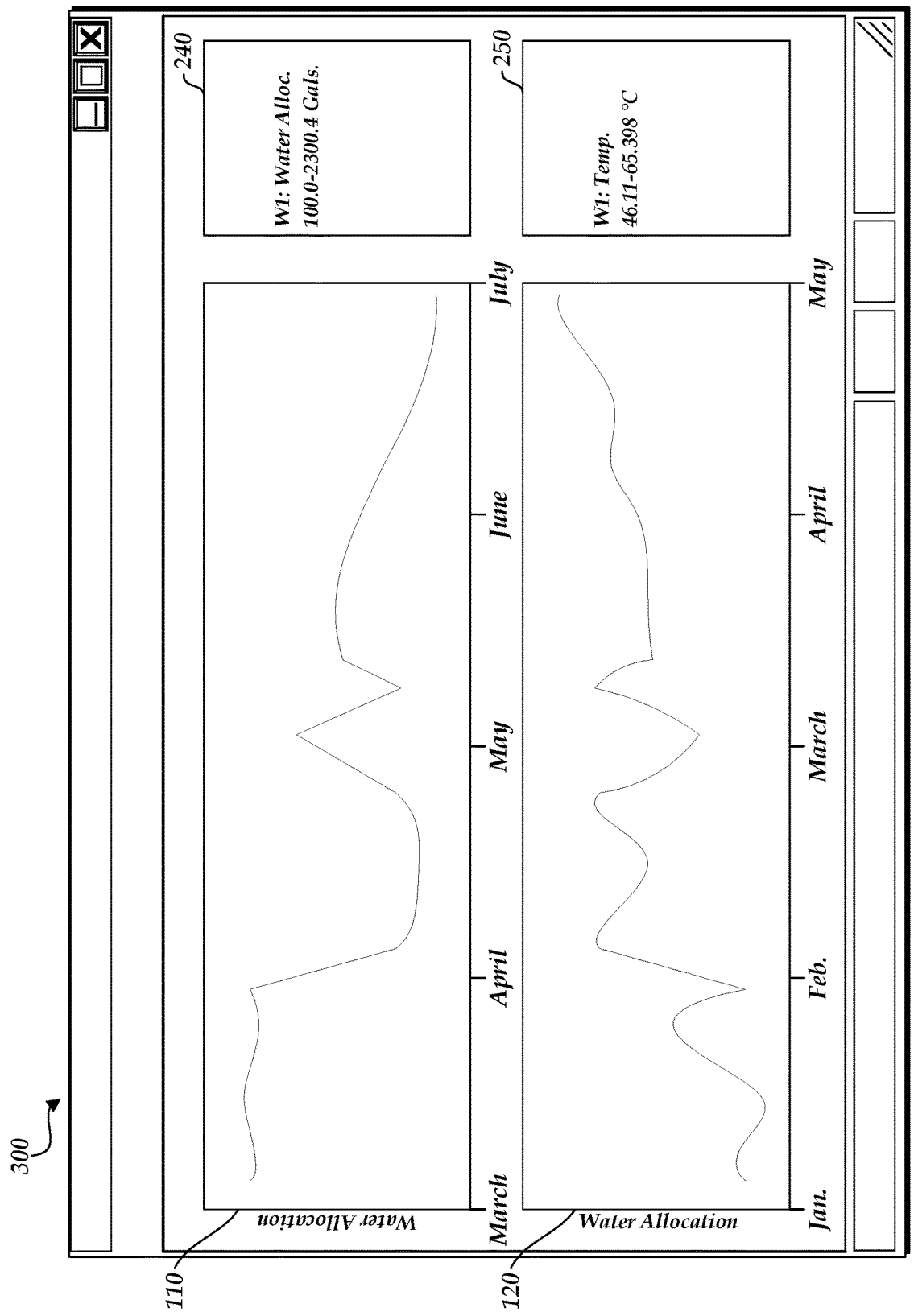

In further embodiments, the user may elect to synchronize certain manipulations of a graph, but not other manipulations of a graph. For example, the user may select an option to synchronize the zoom level in two or more graphs, but not the time period displayed within the graphs. As illustrated in FIG. 3D, the user has selected an option to synchronize the zoom levels in the graph 110 and the graph 120 (e.g., the x-axis for both graphs 110 and 120 is at the same zoom level), however each graph is displaying data at a different period of time (e.g., the x-axis for graph 110 ranges from March to July and the x-axis for graph 120 ranges from January to May). If the user, for example, places a marker in the graph 110, the marker may appear in the graph 120 if the marker is placed at a time that appears on the x-axis for the graph 120 (e.g., if the marker is placed on April 1st, which also appears on the x-axis in the graph 120). If the user, as another example, manipulates the graph 110 by scrolling to the right, the graph 120 may be manipulated in the same way.

Figure 4A:
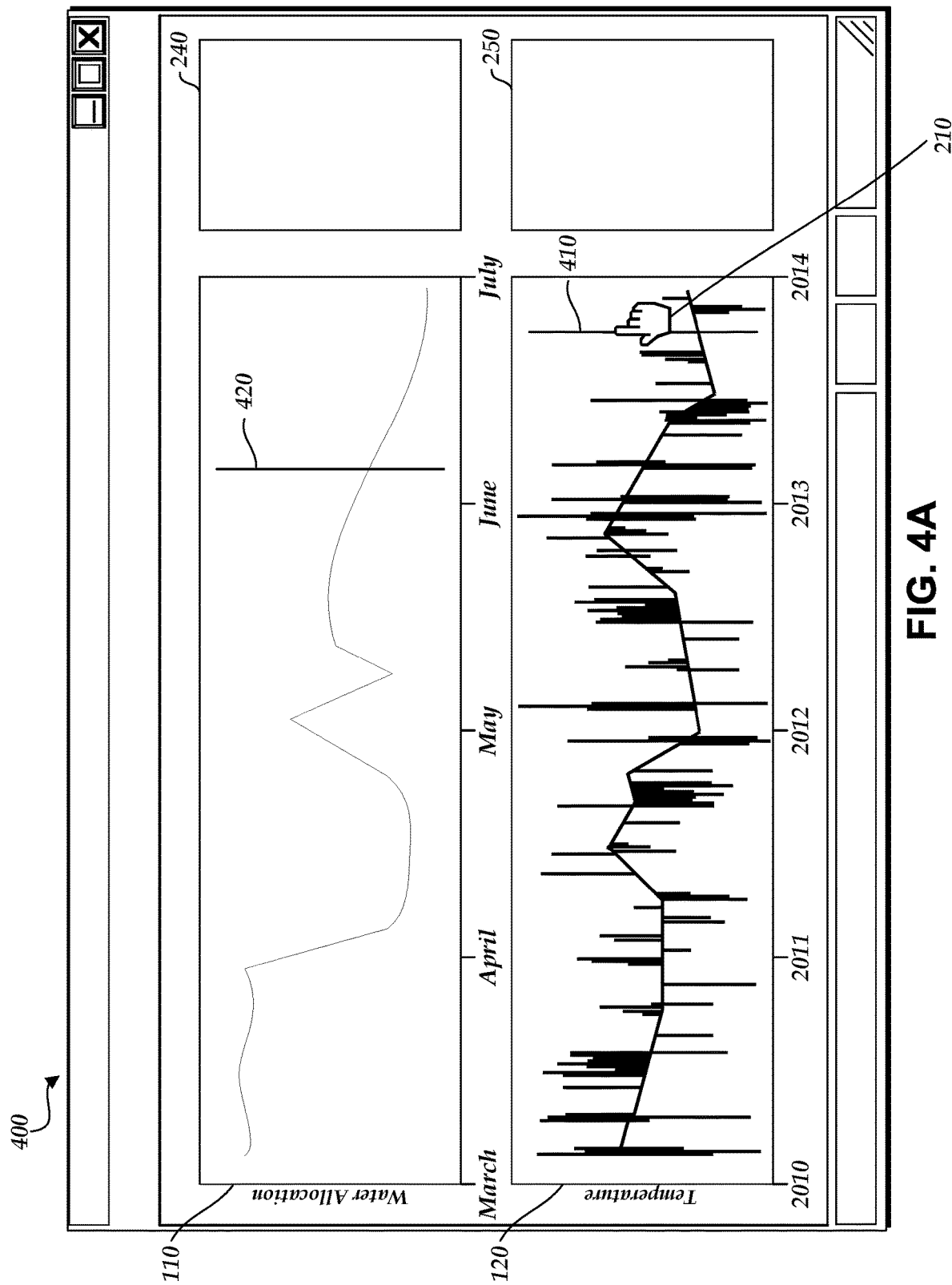
FIGS. 4A-C illustrate another user interface that displays the first time-series graph and the second time-series graph of FIG. 1.
Figure 4B:
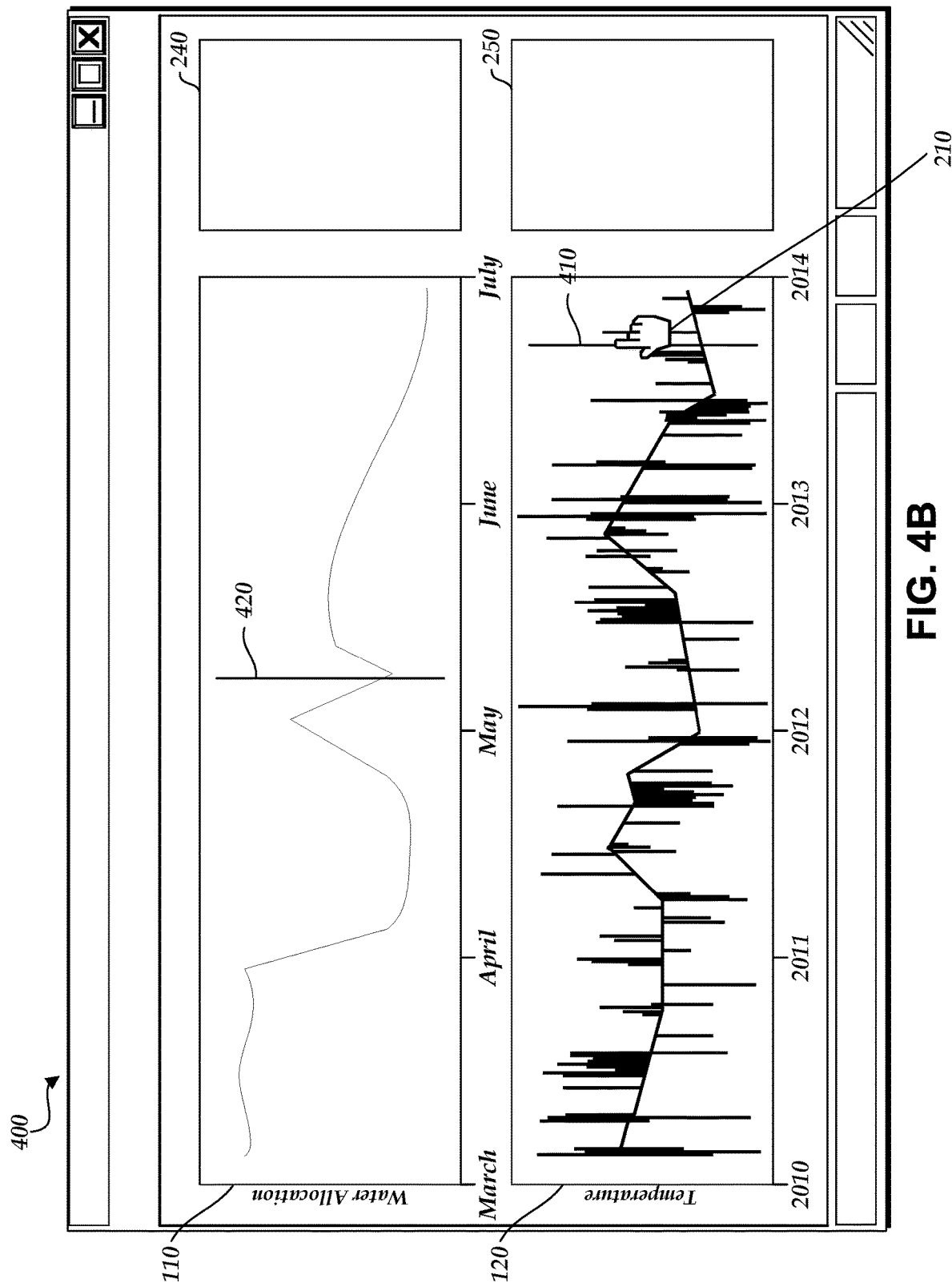
Figure 4C:
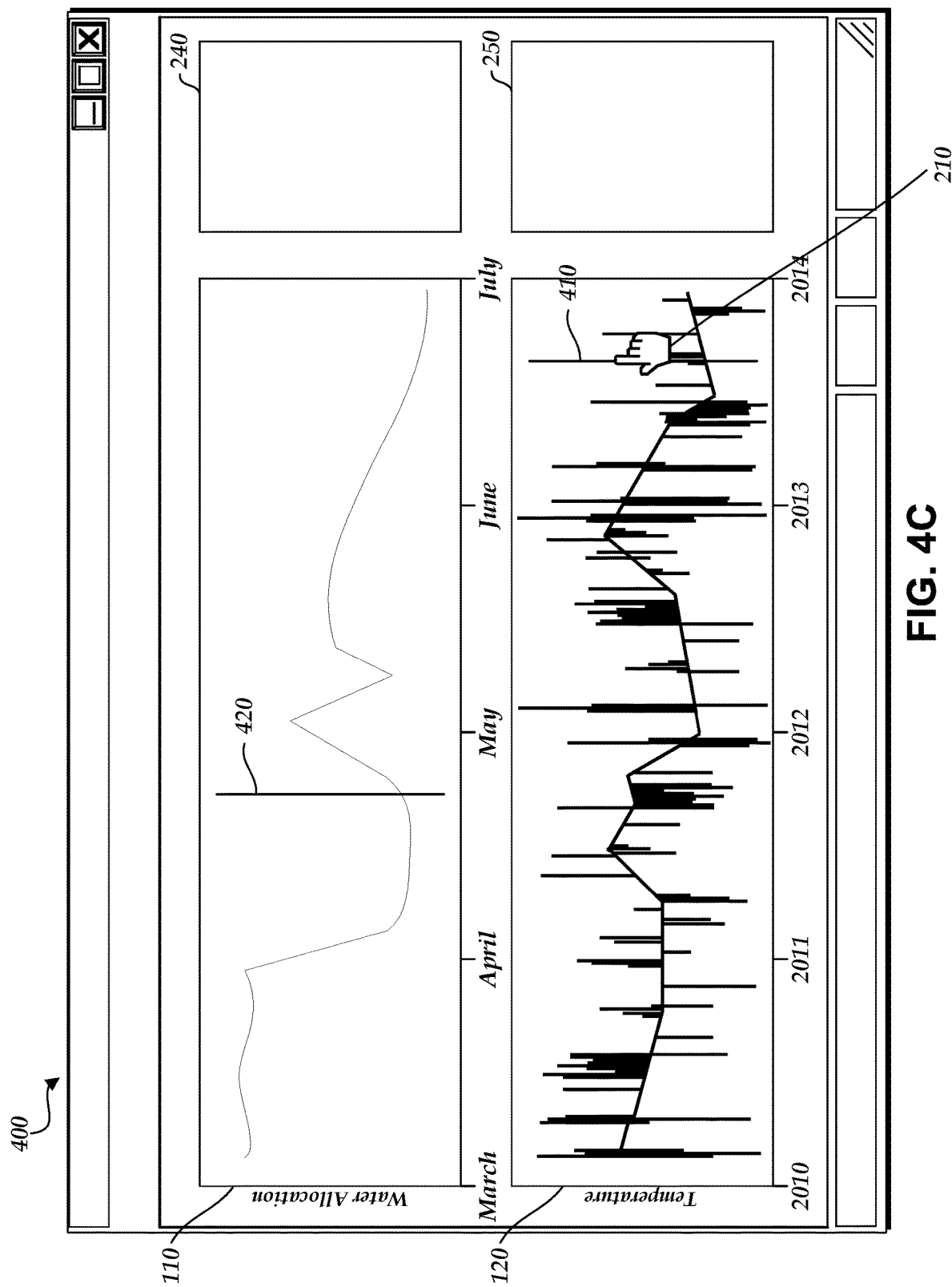

FIGS. 4A-4C illustrate another user interface 400 that displays the time-series graph 110 and the time-series graph 120. As illustrated in FIG. 4A, a user may place the cursor 210 over a portion of the time-series graph 120. For example, the user may hover over the portion of the time-series graph 120 at the location of the cursor 210. Hovering over the time-series graph 120 may cause the computing system to generate a marker 410 that is displayed in the time-series graph 120 at the location of the cursor 210, and which can be moved in response to movement, by the user, of the hovering cursor 210 over other portions of the graph 120. In addition, a corresponding marker 420 may be displayed in the time-series graph 110. The marker 420 may be located at a location in the time-series graph 110 that represents a water allocation value that was measured at a same time as a temperature value that falls within the time period represented by the marker 410.

In an embodiment, as the user moves the cursor 210 to different locations within the time-series graph 120, the marker 410 may follow the cursor 210. Furthermore, as illustrated in FIGS. 4B-4C, the marker 420 may also move such that the marker 420 continues to correspond to the marker 410 in a manner as described above. Because time scales of the two time-series graphs 110 and 120 are different, movement of the marker 420 may move at a faster rate than movement of the marker 410.

Figure 5A:
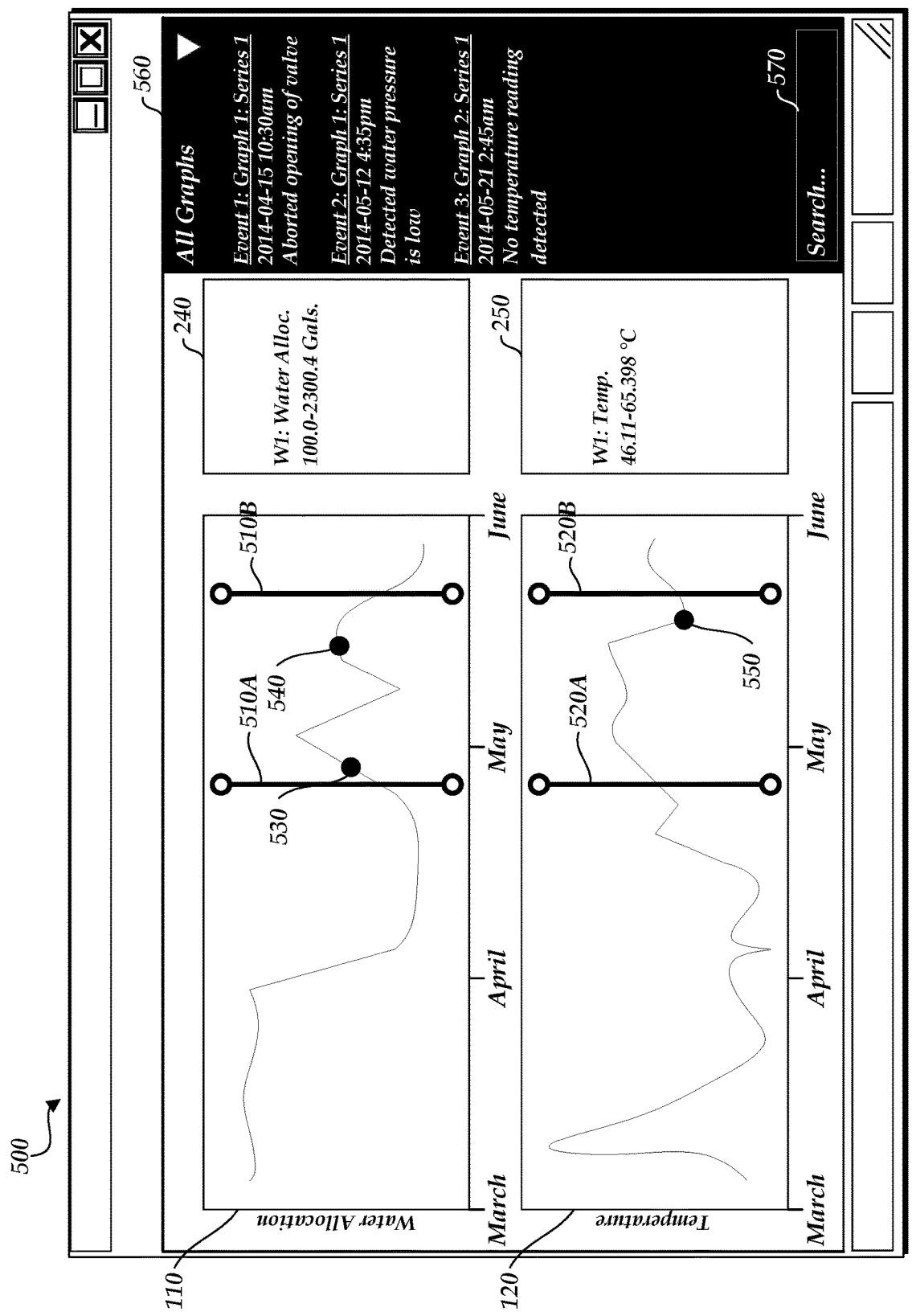
FIGS. 5A-B illustrate another user interface that displays the first time-series graph and the second time-series graph of FIG. 1.
Figure 5B:
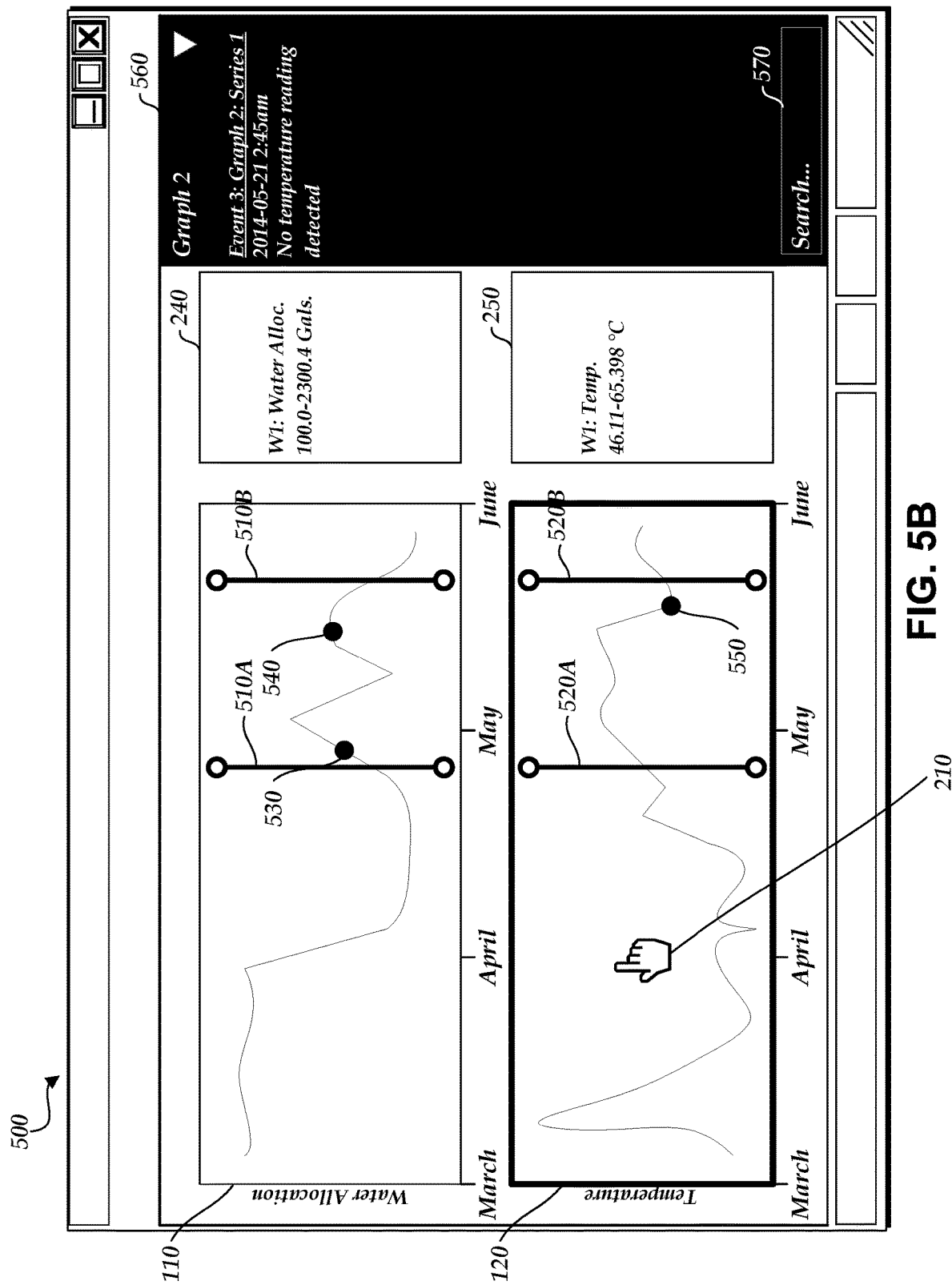

FIGS. 5A-5B illustrate another user interface 500 that displays the time-series graph 110 and the time-series graph 120. As illustrated in FIG. 5A, the time-series graph 110 and the time-series graph 120 include data plotted over the same time period (e.g., March to June). Furthermore, in this example the user may have selected water allocation values in the time-series graph 110 over a particular time period, represented by markers 510A-B, or the user may have selected temperature values in the time-series graph 120 over a time period, represented by markers 520A-B, causing the other time-series graph to display an automatically determined selection of the same time period.

In an embodiment, events (e.g., a manufacturing failure, a contamination event, etc.) may have occurred during the time period associated with the selections in the time-series graph 110 and the time-series graph 120 and/or annotations may be marked. The events that occurred and/or the annotations may be associated with the sensor that measured the water allocation values, the sensor that measured the temperature values, and/or other sensors that measured other data (not shown). Marks 530, 540, and 550 may identify a time at which an event occurred and/or an annotation is marked and/or a time range during which an event occurred and/or an annotation is marked. For example, the mark 530 may indicate that an event occurred or an annotation was marked at a time corresponding to the location of the mark 530 in the time-series graph 110, where the event or annotation is associated with the sensor that measured the water allocation values. Likewise, the mark 540 may indicate that an event occurred or an annotation was marked at a time corresponding to the location of the mark 540 in the time-series graph 110 (e.g., where the event or annotation is associated with the sensor that measured the water allocation values) and the mark 550 may indicate that an event occurred or an annotation was marked at a time corresponding to the location of the mark 550 in the time-series graph 120 (e.g., where the event or annotation is associated with the sensor that measured the temperature values). The marks 530, 540, and/or 550 can be represented in various ways. For example, if the event occurs or the annotation is marked at a specific time instant, the marks 530, 540, and/or 550 can be represented as vertical lines. If the event occurs or an annotation is marked during a range of time, the marks 530, 540, and/or 550 can be represented as blocks (e.g., rectangular blocks) that encompass the time range.

Furthermore, the user interface 500 may include an event information pane or notebook 560. The event information pane 560 may include information on the events that occurred (and/or annotations made by the user) corresponding to the sensors that measured the water allocation data, the temperature data, and/or other data (not shown). The information may include a time-series graph or sensor that the event or annotation is associated with, a time-series within the time-series graph that the event or annotation is associated with, a time that the event occurred (or that the annotation is associated with), and a description of the event or annotation itself, such as a description of the event or annotation provided by a human operator. In an embodiment, the event information pane 560 includes event or annotation information for any event that occurred during a time range for which data was collected and/or for any annotation marked within a time range for which data was collected. In another embodiment, the information displayed in the event information pane 560 is for events that occurred during the entire time range displayed (e.g., March to June) and/or for annotations marked during the entire time range displayed. In another embodiment, the information displayed in the event information pane 560 is for events that occurred during the selected portions (e.g., late April to late May, as represented by the markers 510A-B and 520A-B) and/or for annotations marked within the selected portions. The user interface may include controls that allow the user to select the desired time period for which event information should be included in the event information pane 560.

The event information pane 560 may display event and/or annotation information for every available time-series graph or just selected time-series graphs. For example, the user may use cursor 210 to select the time-series graph 120 (e.g., also referred to as "Graph 2") and not the time-series graph 110 (e.g., also referred to as "Graph 1"), as illustrated by the dark outline of time-series graph 120 in FIG. 5B. Selecting the time-series graph 120 may cause the event information pane 560 to only display the events and/or annotations that are associated with the time-series graph 120 (e.g., the sensor that measured the temperature values) during the currently selected time period associated with markers 520A and 520B. The event information pane 560 may also include a search field 570 that allows the user to search for and identify specific events and/or annotations that may have occurred or been marked within the currently displayed events (or among other events that are not displayed in some embodiments).

Figure 6A:
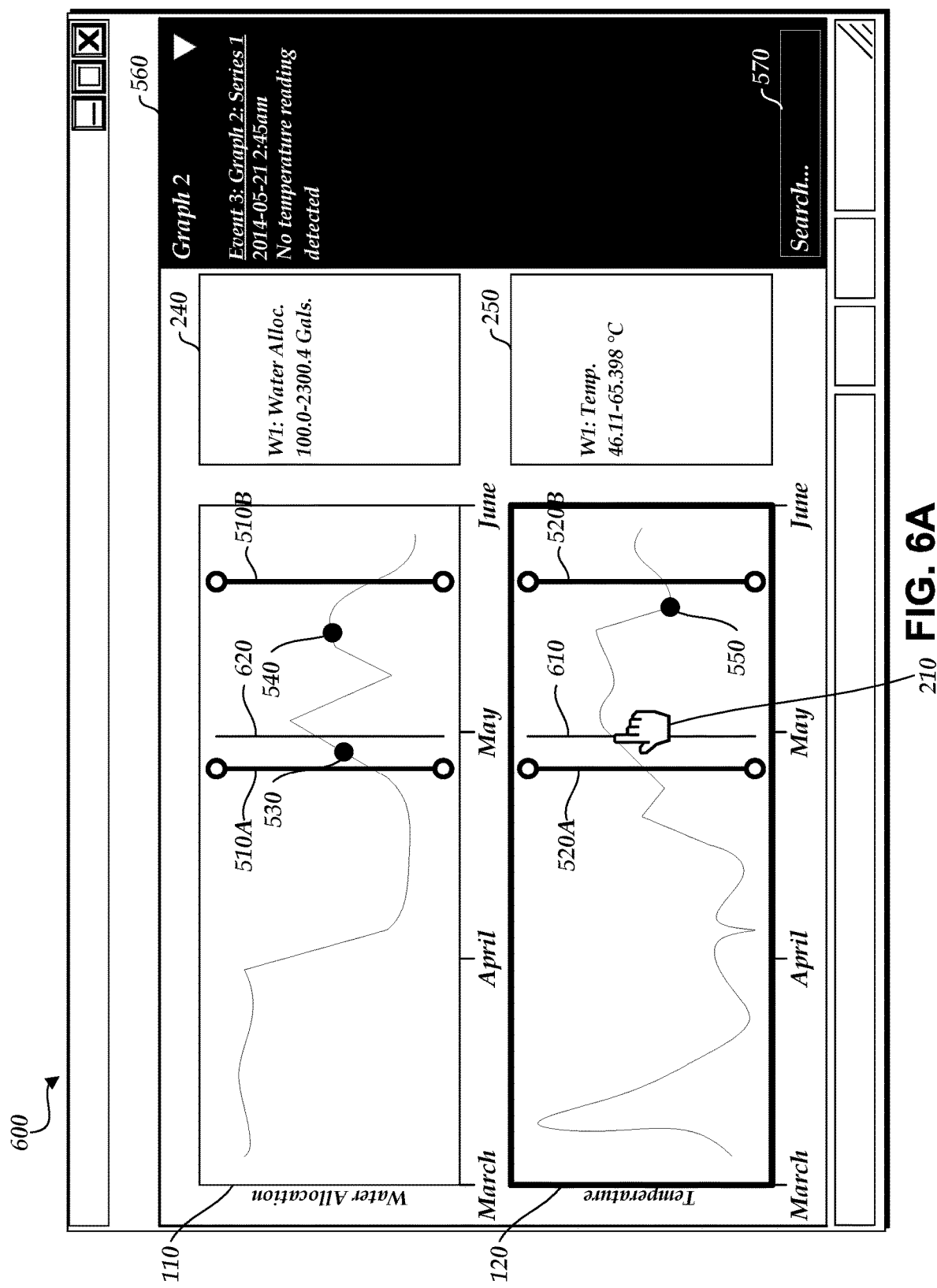
FIGS. 6A-C illustrate another user interface that displays the first time-series graph and the second time-series graph of FIG. 1.
Figure 6B:
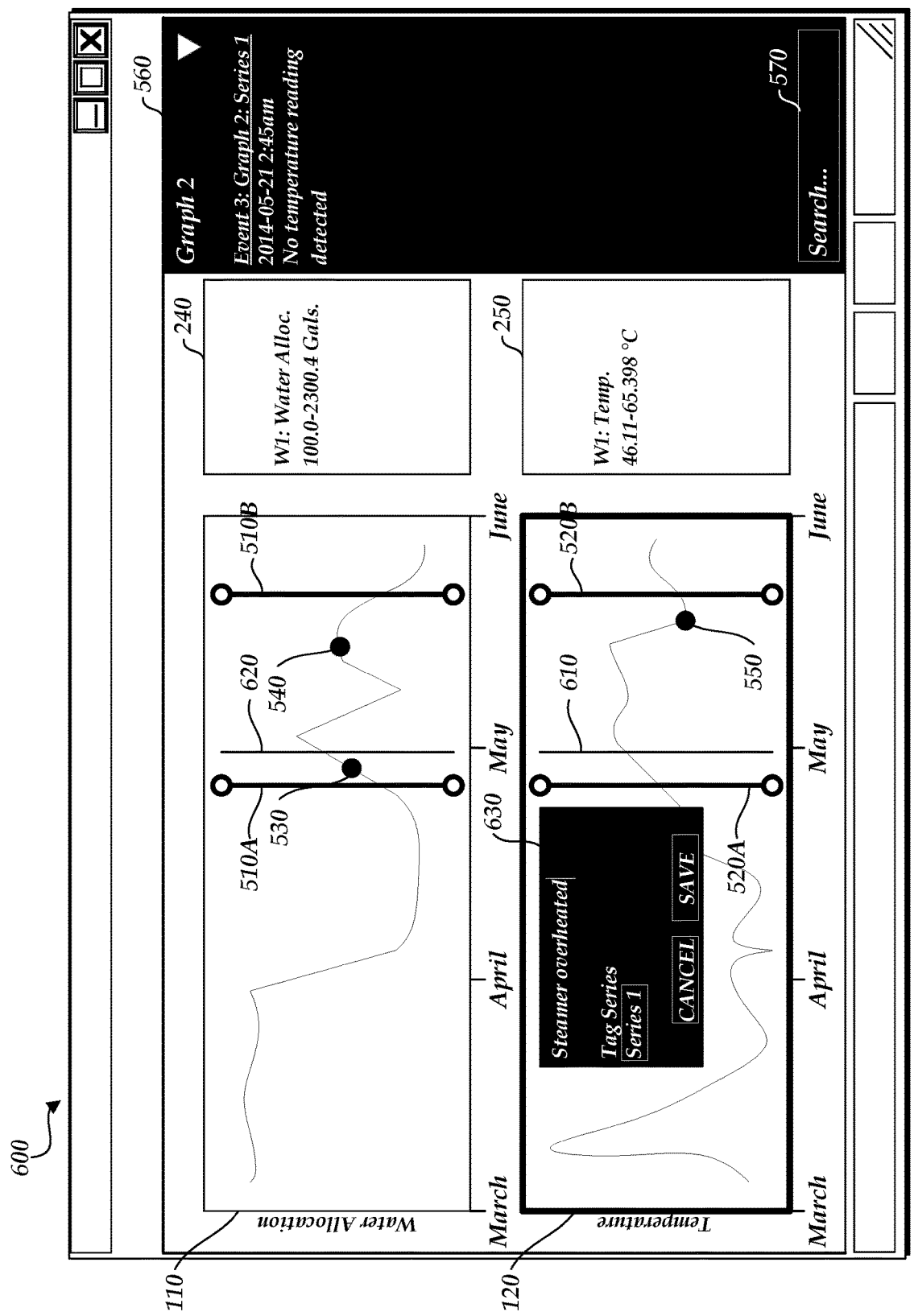
Figure 6C:
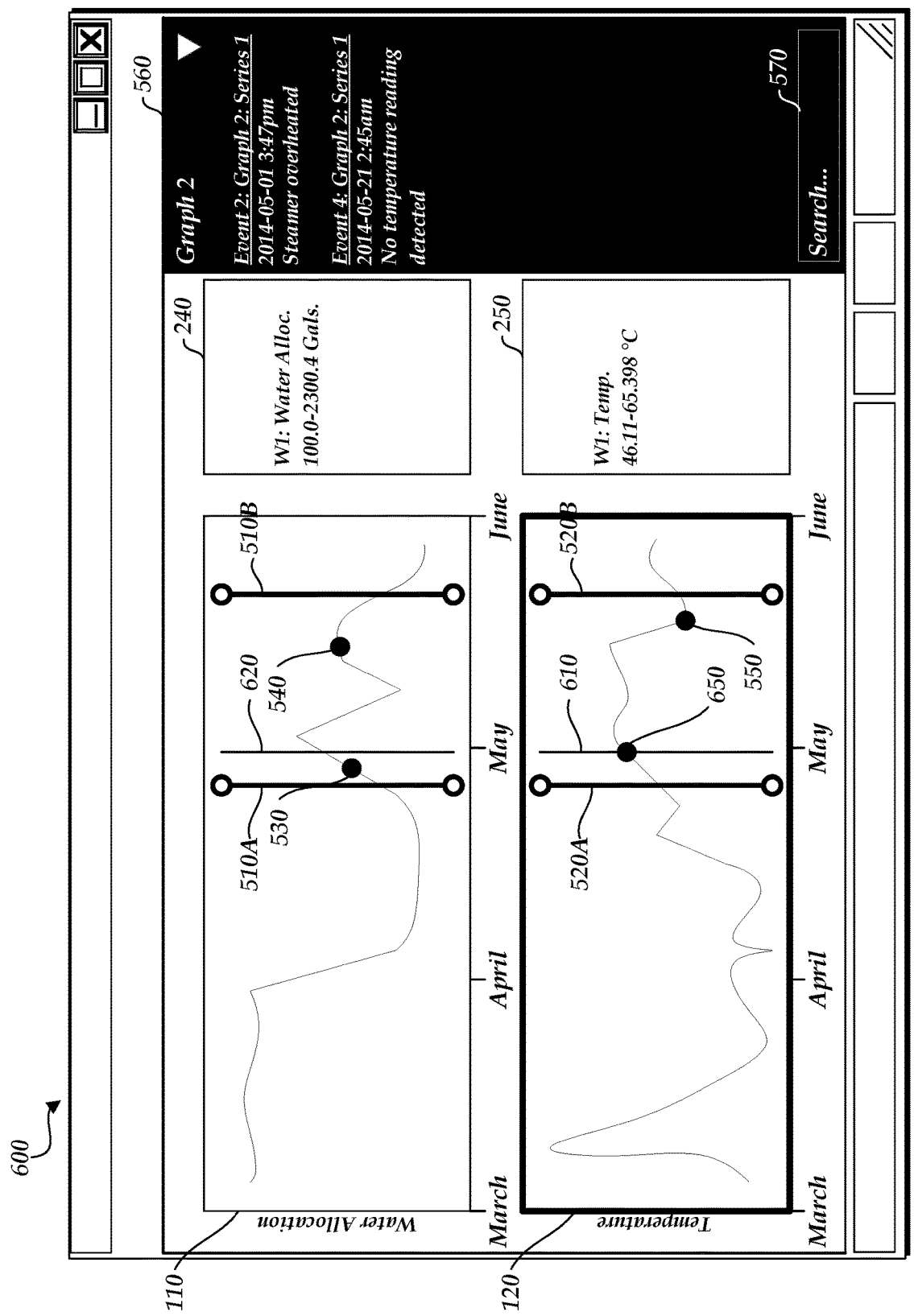

FIGS. 6A-6C illustrate another user interface 600 that displays the time-series graph 110 and the time-series graph 120. As illustrated in FIG. 6A, the time-series graph 120 has been selected by the user (as indicated by the dark outline around time-series graph 120). In this example, the user is hovering the cursor 210 over the time-series graph 120, causing the user interface 600 to display marker 610 at the location of the cursor 210. As described above, a marker 620 corresponding to the marker 610 may be displayed in the time-series graph 110 as a result.

As illustrated in FIG. 6B, the user may provide an instruction to add an event and/or an annotation at a time (or time range) that corresponds to the location of the cursor 210. For example, the user may right-click on a mouse, tap a touch screen, or press a keyboard hotkey to indicate that an event is to be added. Once the user interface 600 receives the instruction, the user interface 600 may display an add event window 630 that appears near a location where the event and/or annotation is to be added. The add event window 630 may be a pop-up window or may be a window that overlays the window displaying the time-series graphs 110 and 120.

In an embodiment, the user can specify a description of the event and/or annotation and a time-series within the time-series graph 120 that the event and/or annotation corresponds to within the add event window 630. As described above, the time-series graph 120 can depict multiple time-series data. However, the time-series graph 120 as illustrated in FIG. 6B only includes a single time-series (e.g., the temperature time-series data, also referred to as "Series 1"). Thus, the add event window 630 only provides an option to associate the event and/or annotation with the time-series depicted in the time-series graph 120. However, if the time-series graph 120 as illustrated in FIG. 6B included two or more time-series, then the add event window 630 would provide the option to specify that the event and/or annotation corresponds to the first time-series (e.g., the temperature time-series), a second time-series, a third time-series, and so on, and/or all time-series graphs or combinations of graphs that are displayed within the time-series graph 120. In many embodiments, each time-series graph is associated with a different sensor or other data source, while in other embodiments a time-series graph may be associated with multiple sensors or other data sources, such as to indicate derived values that are based on two or more sensor values (e.g., a ratio of temperature to pressure). In other embodiments, not shown, the user can specify that an event and/or annotation can be associated with time-series depicted in different time-series graphs (e.g., the time-series graph 110 and the time series-graph 120).

As illustrated in FIG. 6C, the user has specified that the new event and/or annotation is to correspond with the temperature sensor time-series data (illustrated in time-series graph 120). Accordingly, a mark 650 is placed in the time-series graph 120 at the corresponding time. Because the time-series graph 120 is still selected for display of event information, the event information pane 560 is updated to include information about the newly added event and/or annotation (e.g., "Event 2"). Note that former "Event 3" has now become "Event 4" because the events and/or annotations can be listed (and/or numbered) in chronological order and the newly added event or annotation occurs prior to "Event 4" represented by marker 550.

Figure 7A:
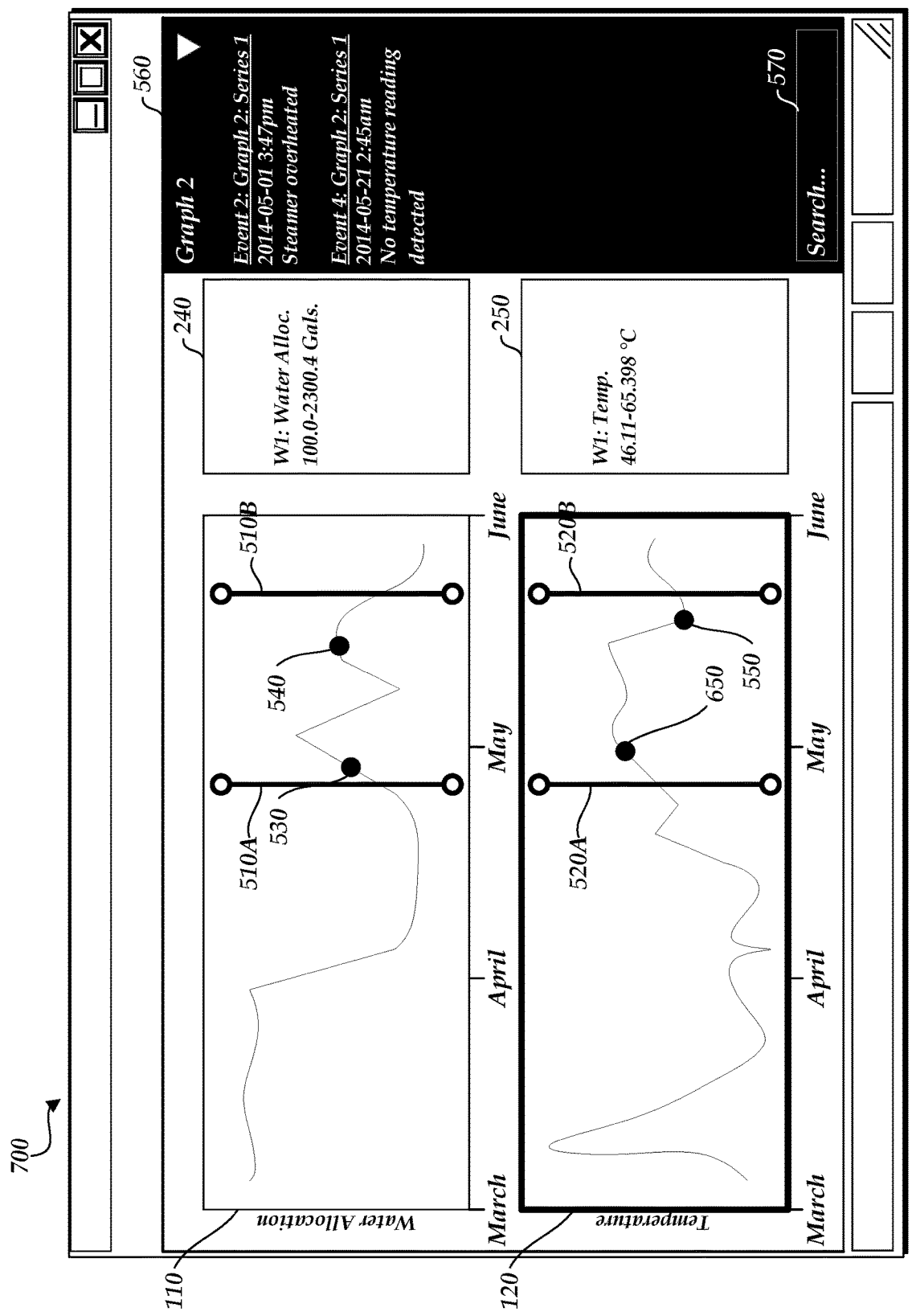
FIGS. 7A-C illustrate another user interface that displays the first time-series graph and the second time-series graph of FIG. 1.
Figure 7B:
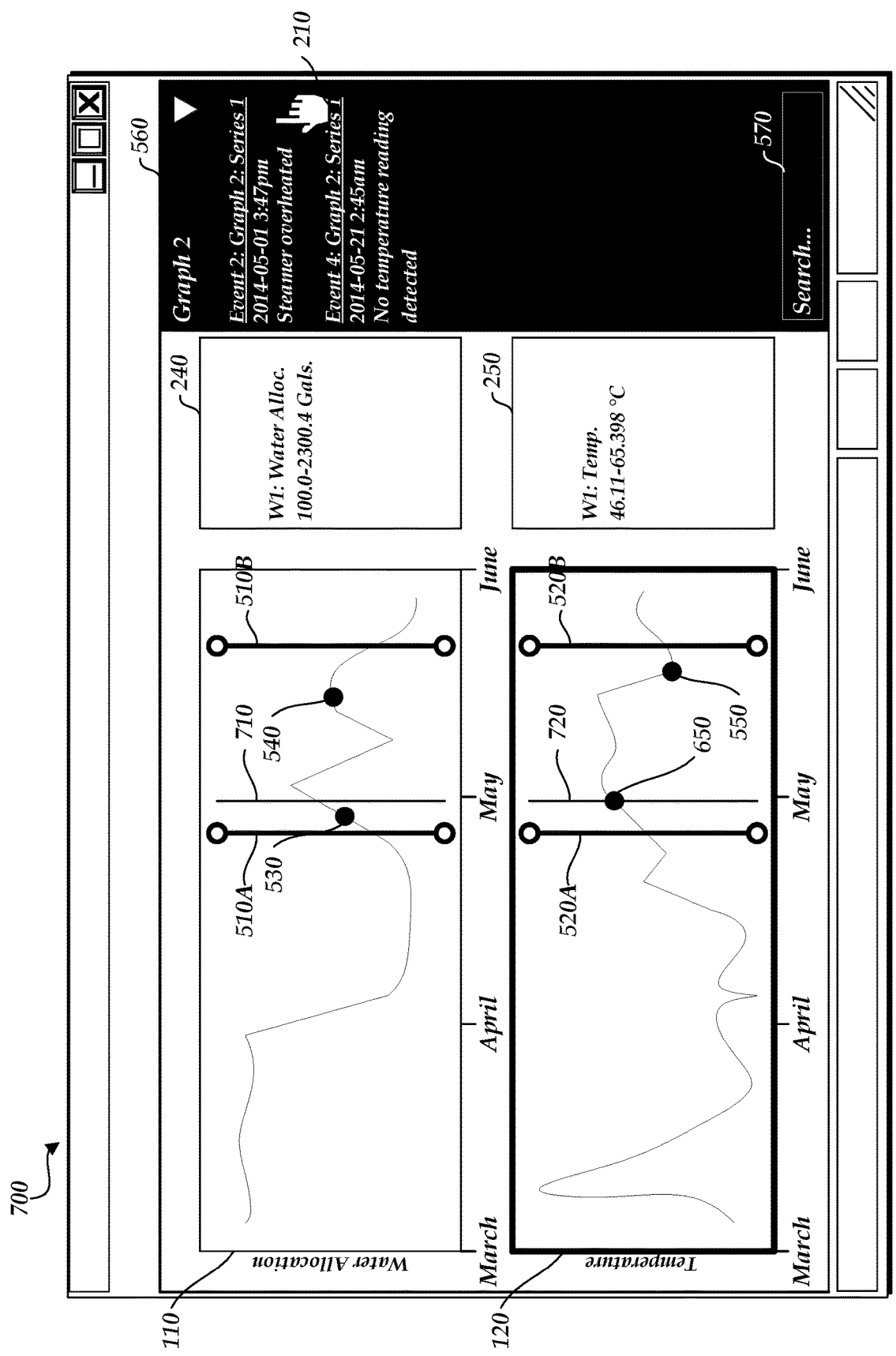
Figure 7C:
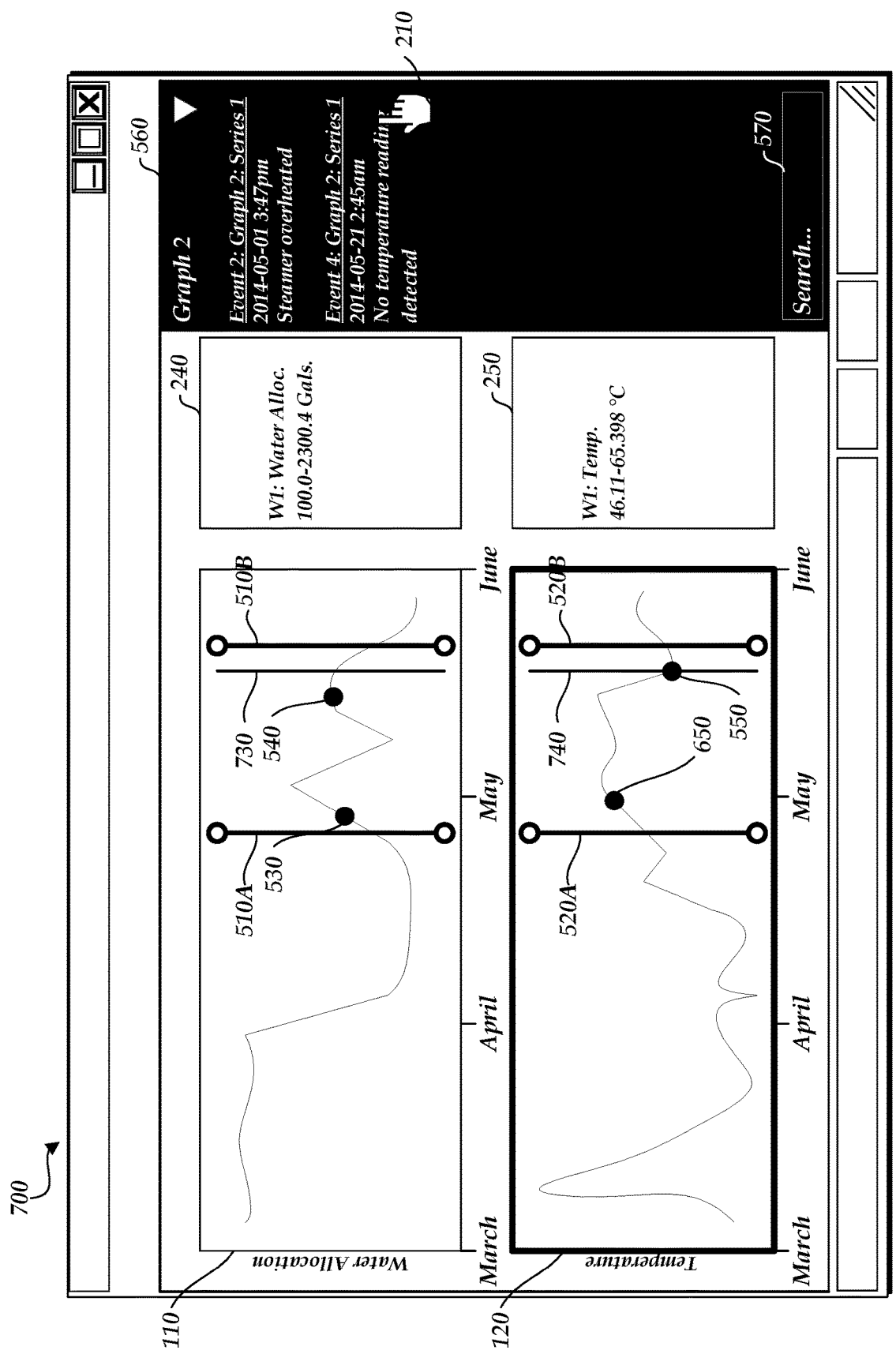

FIGS. 7A-7C illustrate another user interface 700 that displays the time-series graph 110 and the time-series graph 120. As illustrated in FIG. 7A, the time-series graph 120 has been selected by the user. Furthermore, the event information pane 560 includes two events: Event 2 that corresponds with the mark 650 and Event 4 that corresponds with the mark 550.

As illustrated in FIG. 7B, the user may hover over information about an event and/or annotation using the cursor 210. In the example of FIG. 7B, the user has hovered over the Event 2. In an embodiment, when the cursor 210 hovers over and/or is used to select an event and/or annotation, a marker is displayed at a location of the event and/or annotation in the corresponding time-series graph(s). For example, when the cursor 210 hovers over Event 2, a marker 710 is displayed at a location in the time-series graph 110 that corresponds with a time that the event and/or annotation occurred and/or a marker 720 is displayed at a location of the mark 650 in the time-series graph 120. In other embodiments, an event and/or annotation may be selected in any other manner and indications of the corresponding data on the time-series graphs may be indicated in other visual representations, such as an animated circular marker that changes size, blinks off and on, etc.

As illustrated in FIG. 7C, the user has moved the cursor over Event 4. When the cursor 210 hovers over Event 4, a marker 730 is displayed at a location in the time-series graph 110 that corresponds with a time that the event and/or annotation occurred and a marker 740 is displayed at a location of the mark 550 in the time-series graph 120.

Figure 8A:
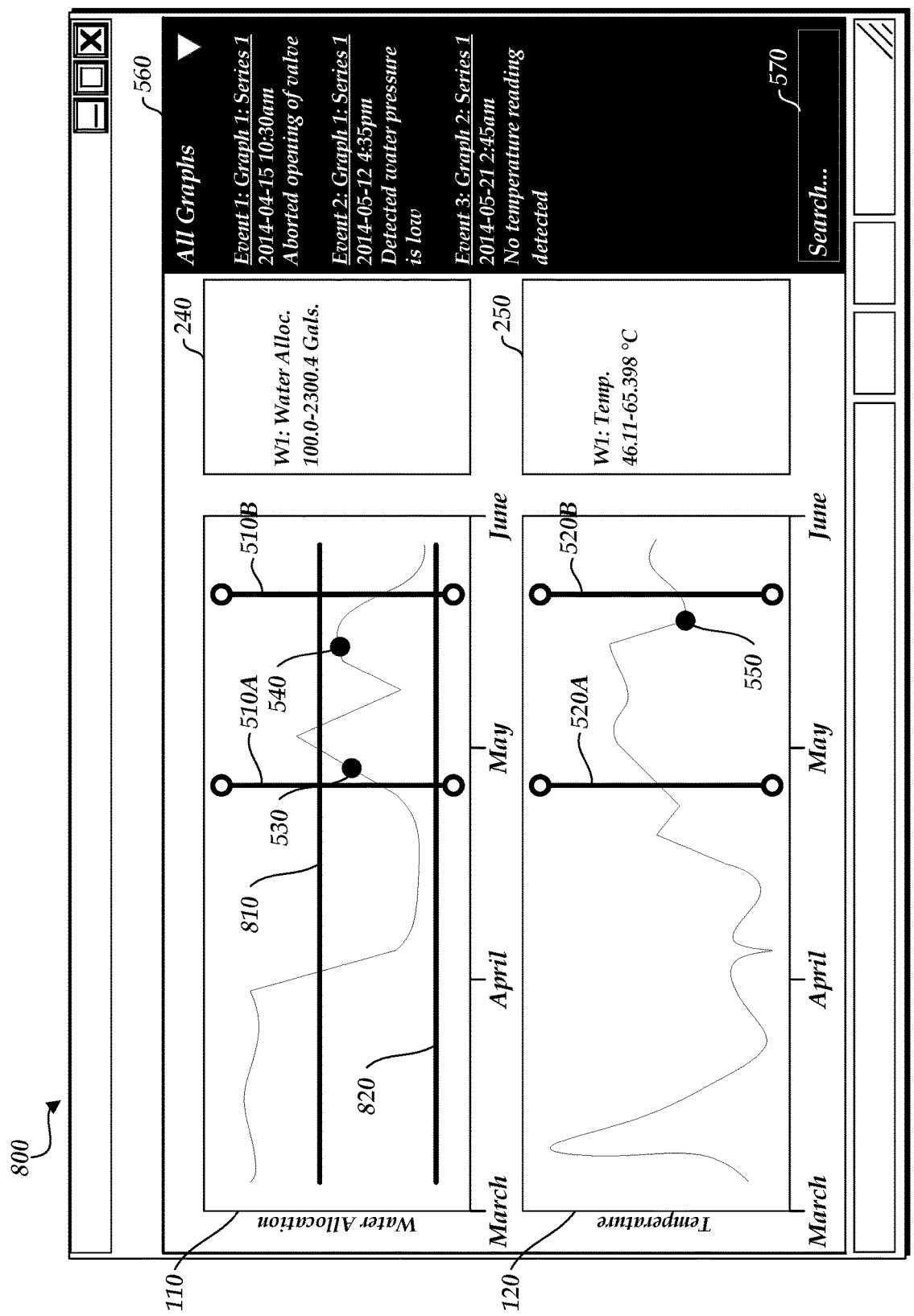
FIGS. 8A-B illustrate another user interface that displays the first time-series graph and the second time-series graph of FIG. 1.
Figure 8B:
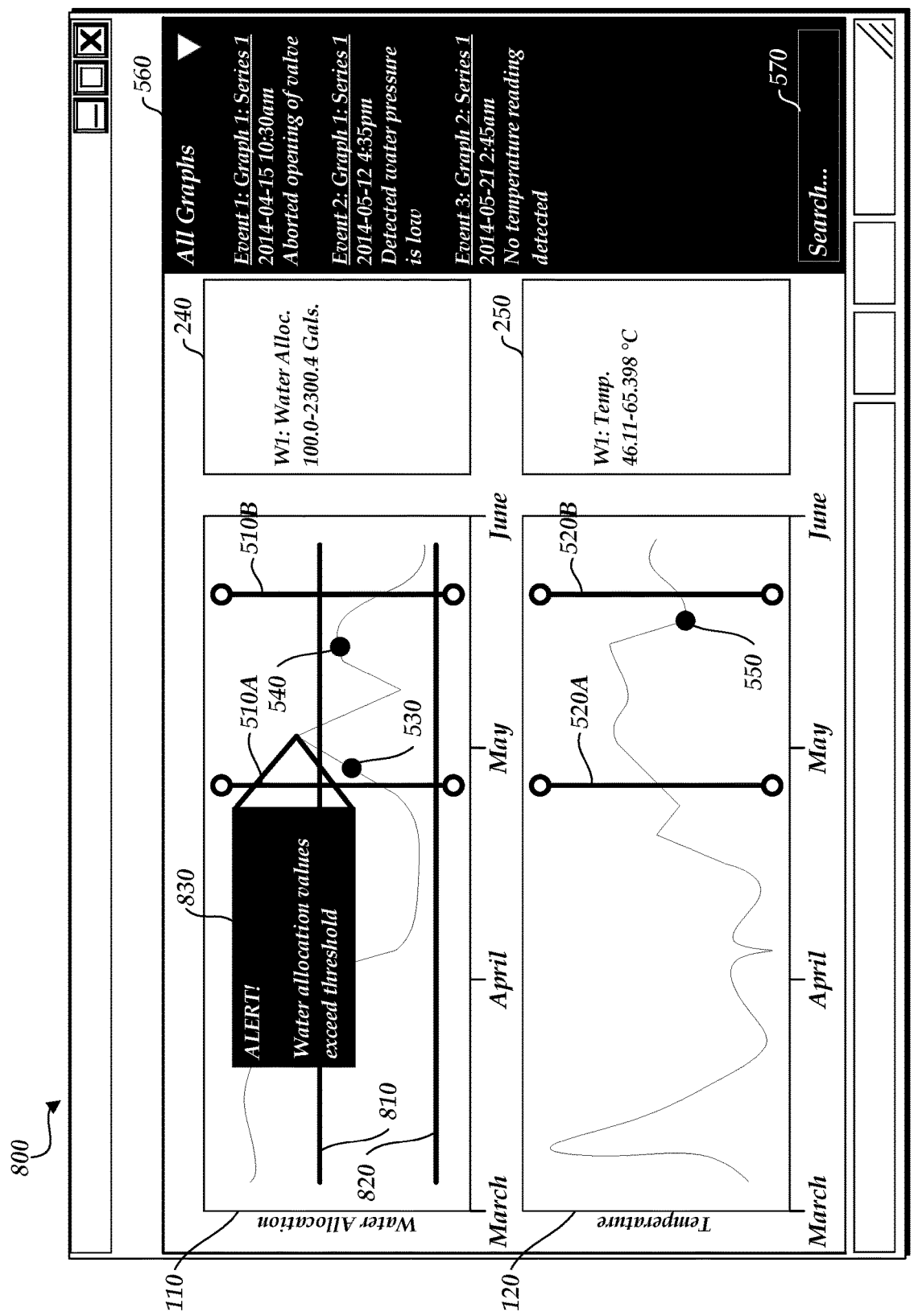

FIGS. 8A-8B illustrate another user interface 800 that displays the time-series graph 110 and the time-series graph 120. In some embodiments, a physical component that is monitored by a sensor may begin to operate outside normal operating conditions. For example, the physical component may have encountered a mechanical issue that causes the physical component to operate at sub-optimal levels. In some cases, the abnormal performance of the physical component could cause a system slowdown or failure. Accordingly, the computing system that generates the user interface 800 may generate an alert to notify a human operator of the abnormal operation.

In an embodiment, the abnormal performance of the physical component is represented by sensor values that are outside of an expected range and an alert may be triggered when the sensor values are outside of the expected range. For example, an alert may be generated for a sensor that measures temperature values for a physical component of an oil well if the measured temperature values exceed certain levels (e.g., 200° F.). Alerts may also be triggered based on a combination of sensor values. For example, an alert may be triggered if values associated with a first sensor (e.g., a temperature sensor) exceed certain values and values associated with a second sensor (e.g., a pressure sensor) do not exceed certain values. Triggering of alerts may initiate real-time (or substantially real-time) notifications to one or more users, such as via text messages, email, phone calls, etc. Thus, the alert may allow the user to make adjustments to the sensor and/or other system components in order to reduce impact of the physical component operating outside of its normal range. Alerts may be recorded and associated with a particular sensor and stored for display along side time-series graphs for the particular sensor in the future, such as in the notes or event information areas of the user interface.

The user interface 800 may display markers that indicate when an alert would be or should be triggered. For example, marker 810 may indicate an upper boundary at which point an alert may be triggered and marker 820 may indicate a lower boundary at which point an alert may be triggered. As illustrated in FIG. 8A, an alert was triggered in May as the water allocation values exceeded the value associated with the marker 810.

FIG. 8B illustrates an example recorded alert 830 that was triggered when the water allocation values exceeded the value associated with the marker 810. The user interface 800 may display the alert 830 if a user hovers over the portion of the time-series graph 110 that includes values that exceed the value associated with the marker 810 or that do not exceed the value associated with the marker 820.

Figure 9A:
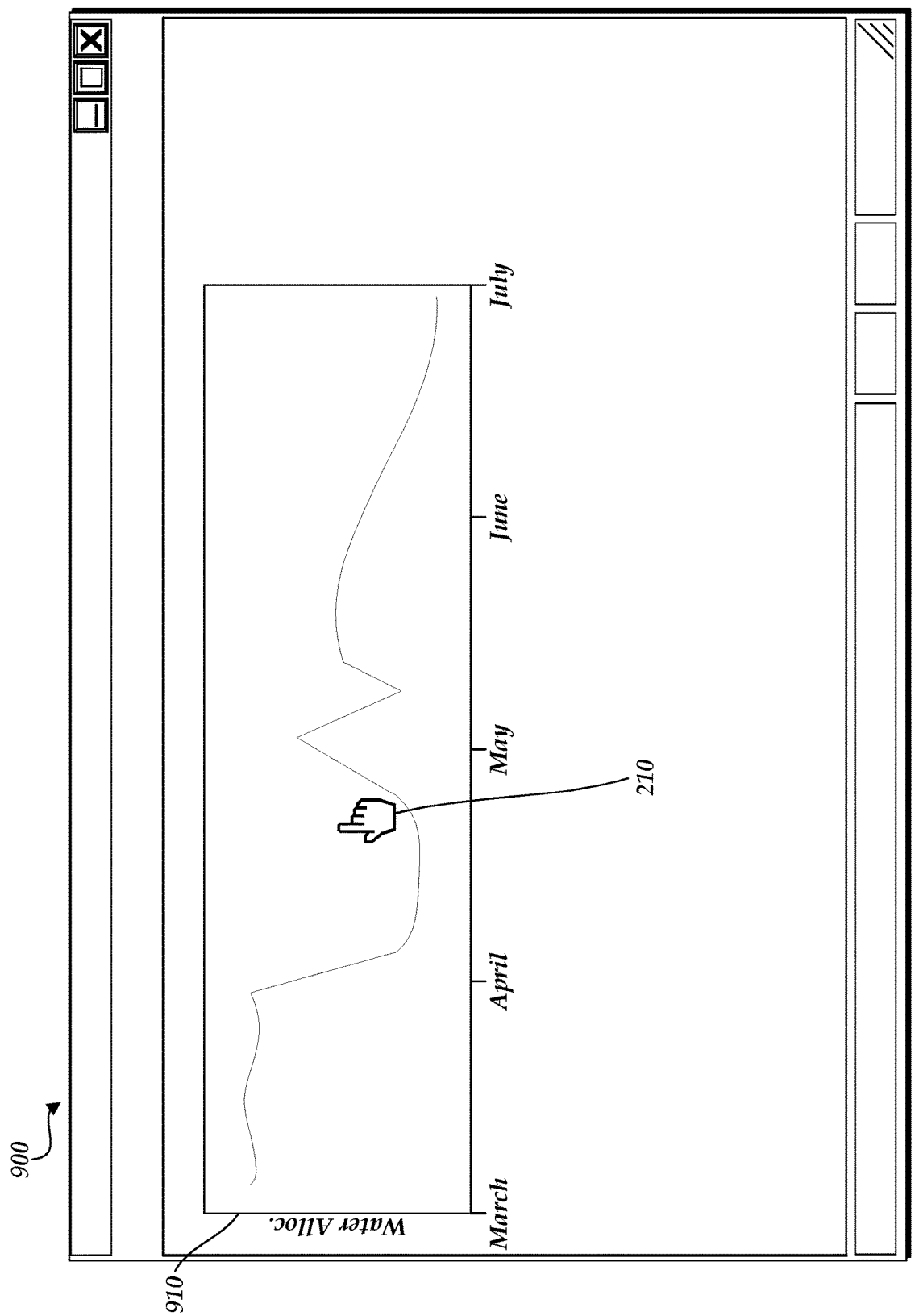
FIGS. 9A-E illustrate another user interface that displays the first time-series graph and the second time-series graph of FIG. 1.

FIGS. 9A-9E illustrate a user interface 900 that correlates time-series and scatterplot graphs. As illustrated in FIG. 9A, the user interface 900 includes a time-series graph 910. The user may use the cursor 210 to begin selecting a portion of the time-series graph 910.

Figure 9B:
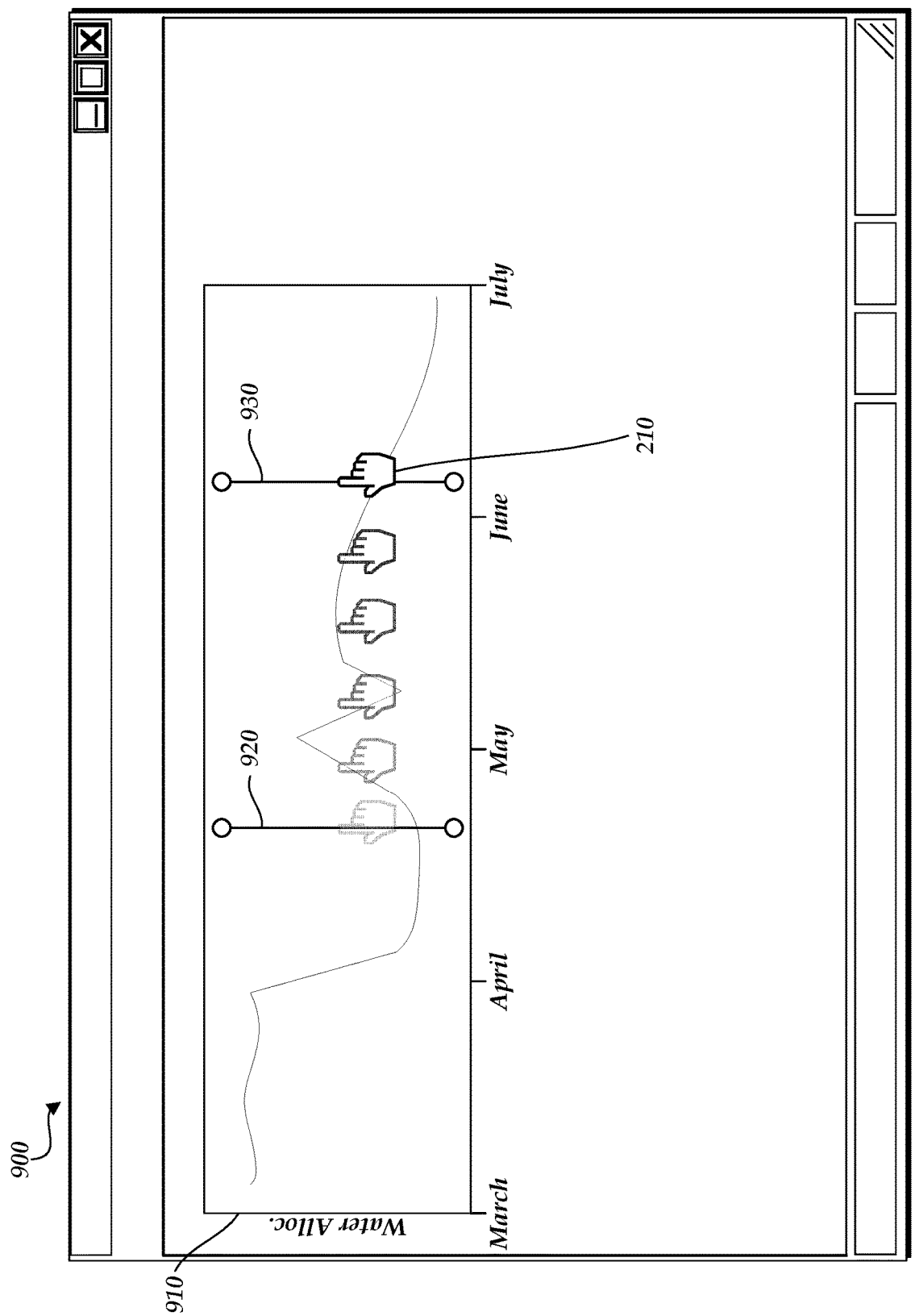

As illustrated in FIG. 9B, the user, via the cursor 210, has selected a portion of the time-series graph 910 represented by markers 920 and 930. The selected portion of the time-series graph 910 represents water allocation values for a time period between late April and early June.

Figure 9C:
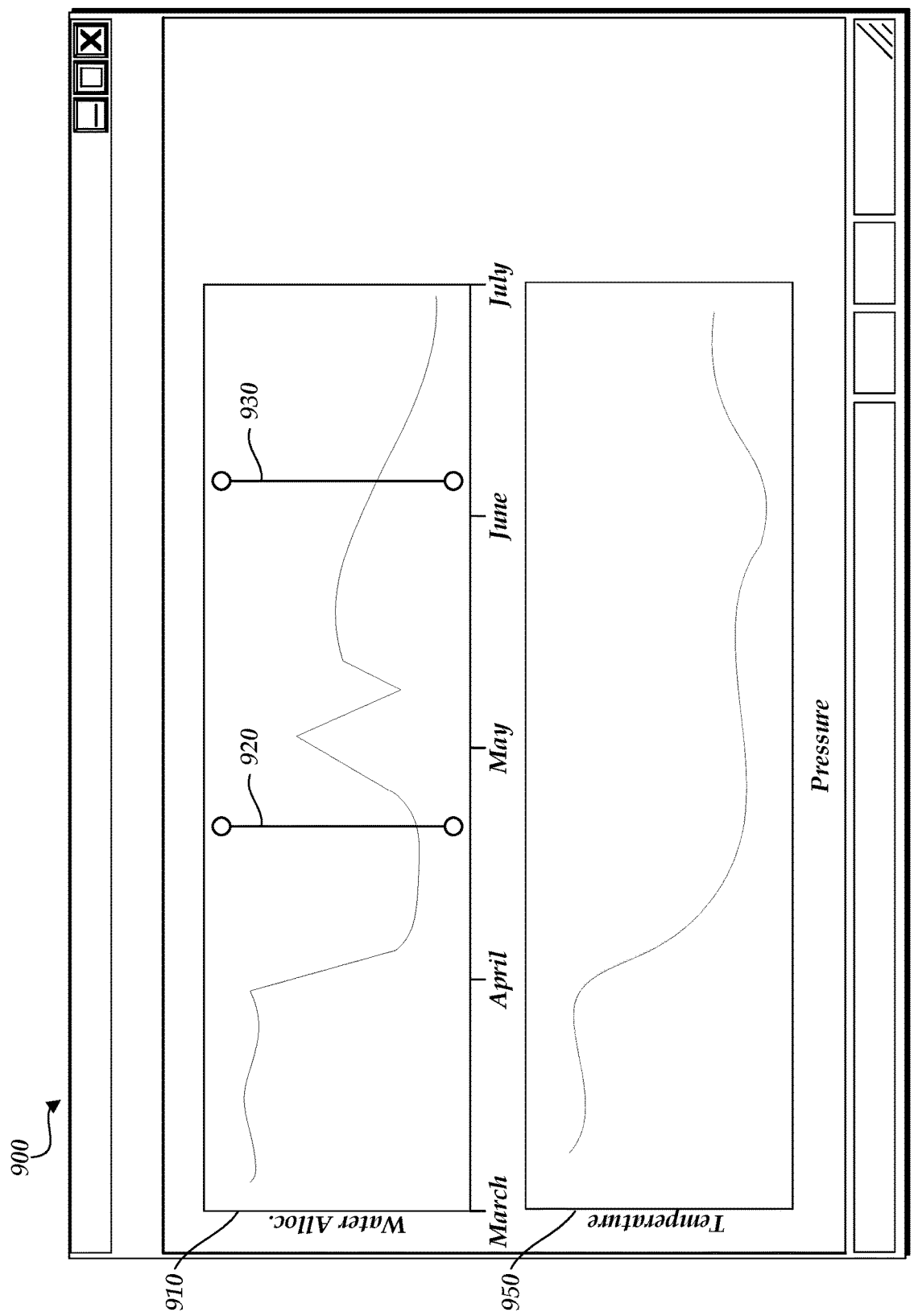

As illustrated in FIG. 9C, based on the selection in the time-series graph 910, a scatterplot 950 is displayed in the user interface 900. The scatterplot 950 may include temperature values plotted against pressure values. Each combination of temperature and pressure values may have been measured at a time within the time period corresponding to the selected portion of the time-series graph 910 (e.g., late April and early June). Thus, for every time increment in the time period, the computing system may retrieve a temperature value and a pressure value and generate the user interface 900 such that it plots the temperature value as a function of the pressure value.

In an embodiment, the water allocation values may be measured by a sensor associated with a system. The temperature values and the pressure values may also be measured by sensors associated with the same system.

Figure 9D:
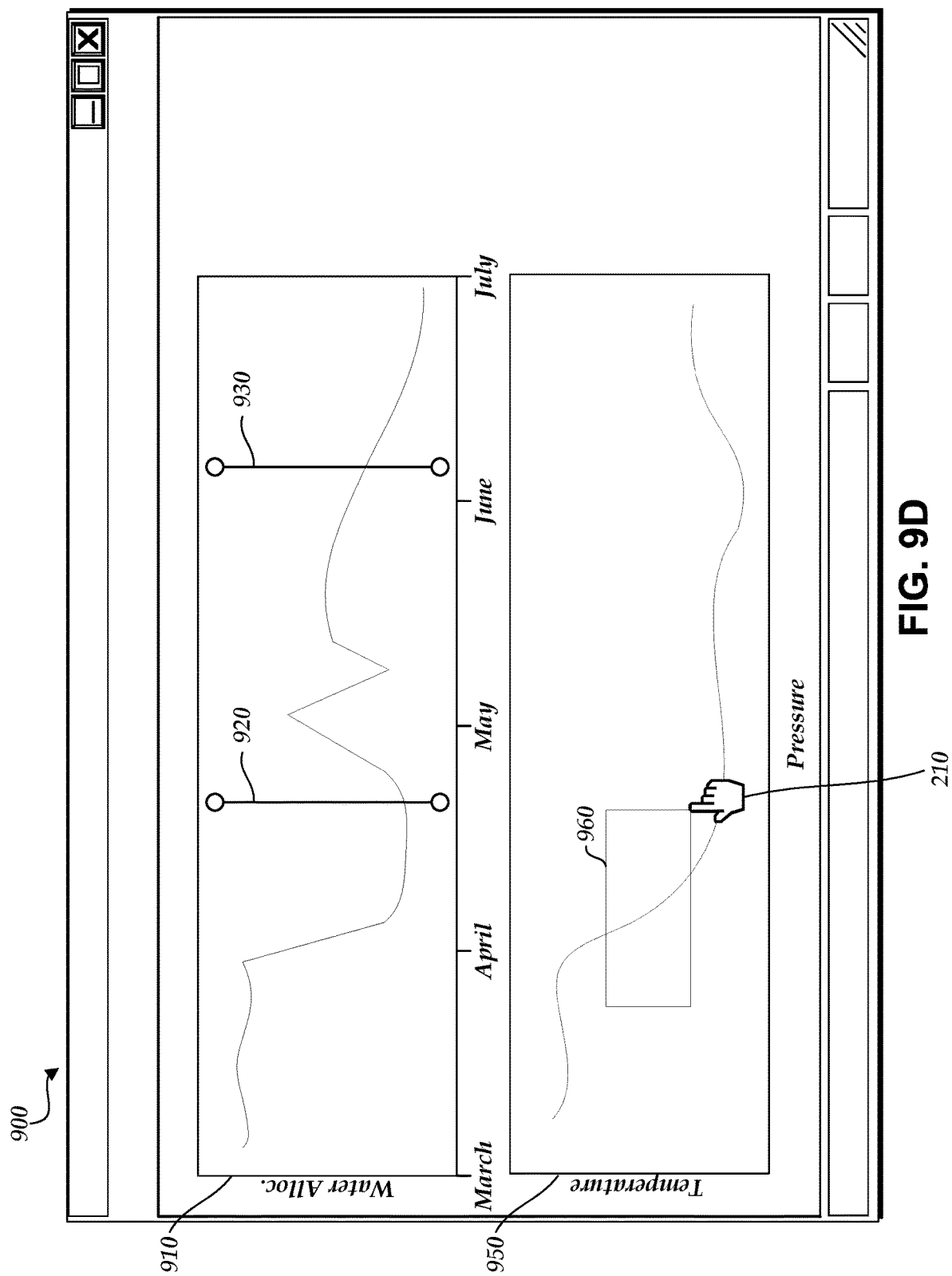

As illustrated in FIG. 9D, the user can make a selection in the scatterplot 950 using the cursor 210. For example, the user can make a selection represented by box 960, where the box 960 includes various combinations of temperature and pressure values.

Figure 9E:
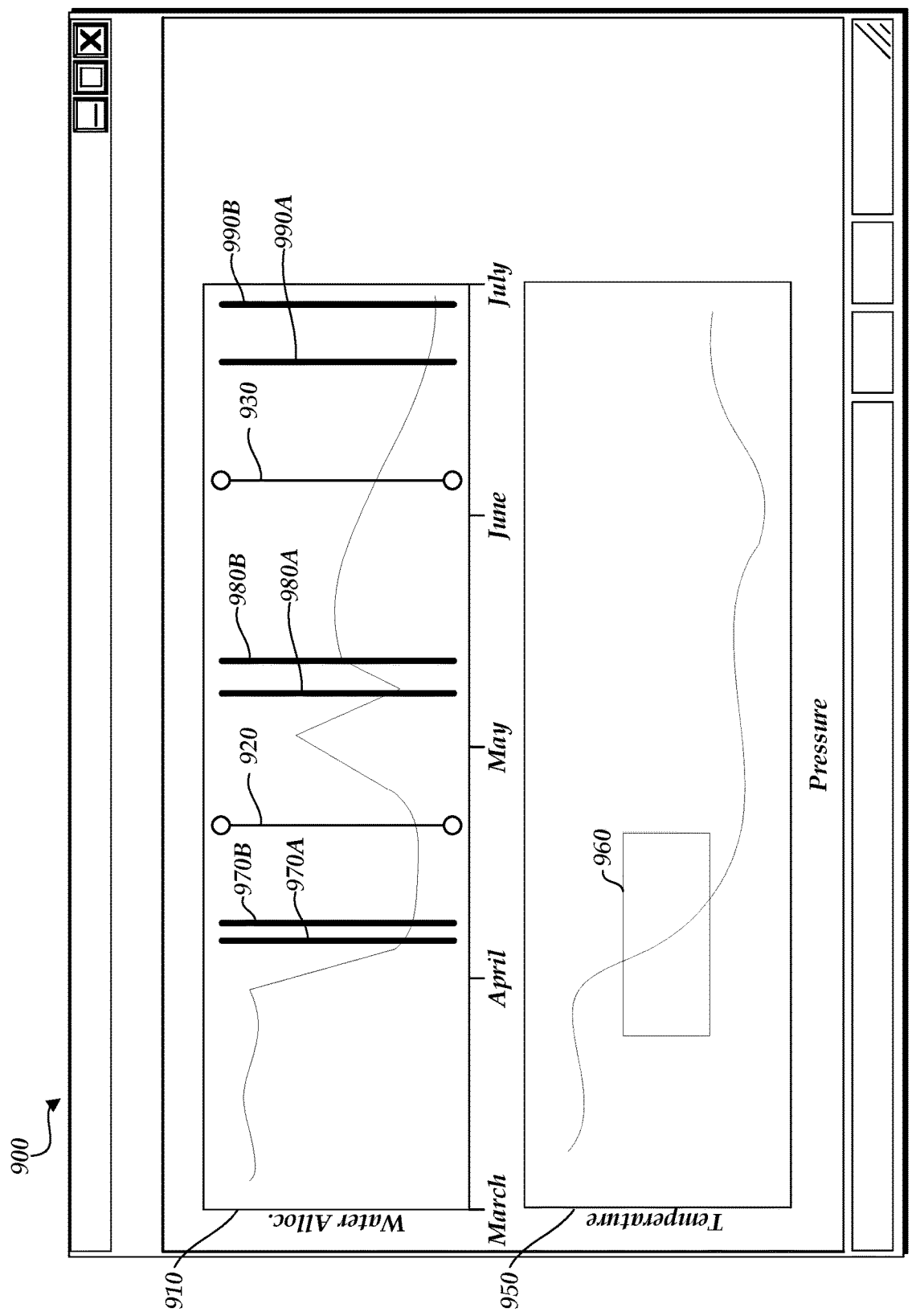

Once the user makes the selection in the scatterplot 950, the computing device may determine all times that the individual combinations of temperature and pressure values within the box 960 occurred. For example, while the combination of temperature and pressure values in the box 960 occurred during the time period between markers 920 and 930, the same combination of temperature and pressure values may have occurred at other times. Thus, the user interface 900 may indicate such times. As illustrated in FIG. 9E, markers 970A and 970B designate a first time period during which some or all combinations of temperature and pressure values in the box 960 occurred, markers 980A and 980B designate a second time period during which some or all combinations of temperature and pressure values in the box 960 occurred, and markers 990A and 990B designate a third time period during which some or all combinations of temperature and pressure values in the box 960 occurred. Alternatively or in addition, the portions of the time-series graph 910 that correspond with the times that the individual combinations of temperature and pressure values within the box 960 occurred can be bolded, highlighted, and/or otherwise annotated to indicate such times.

Example Use Case of an Interactive User Interface with Time-Series Graphs

Figure 10A:
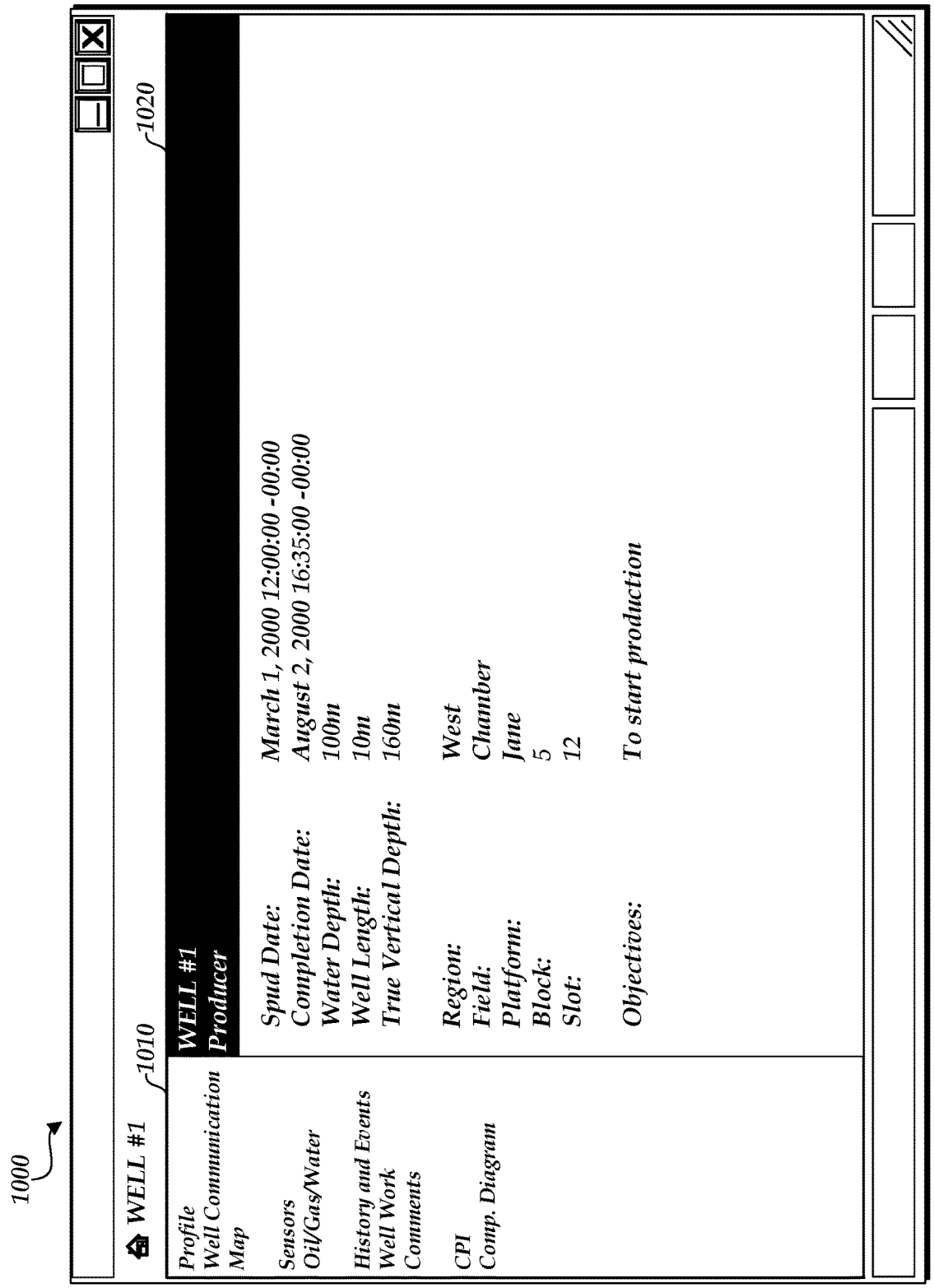
FIGS. 10A-D illustrate a user interface that displays the first time-series graph and the second time-series graph of FIG. 1.

FIGS. 10A-10D illustrate a user interface 1000 that provides interactive information about an oil well. As illustrated in FIG. 10A, the user interface 1000 includes a first window 1010 and a second window 1020. The window 1010 may be a navigation window that includes a list of selectable buttons that can be used to provide further information about the oil well. The window 1020 may be an informational window that provides details about the oil well, such as the well's age, the well's location, and/or the well's objectives.

Figure 10B:
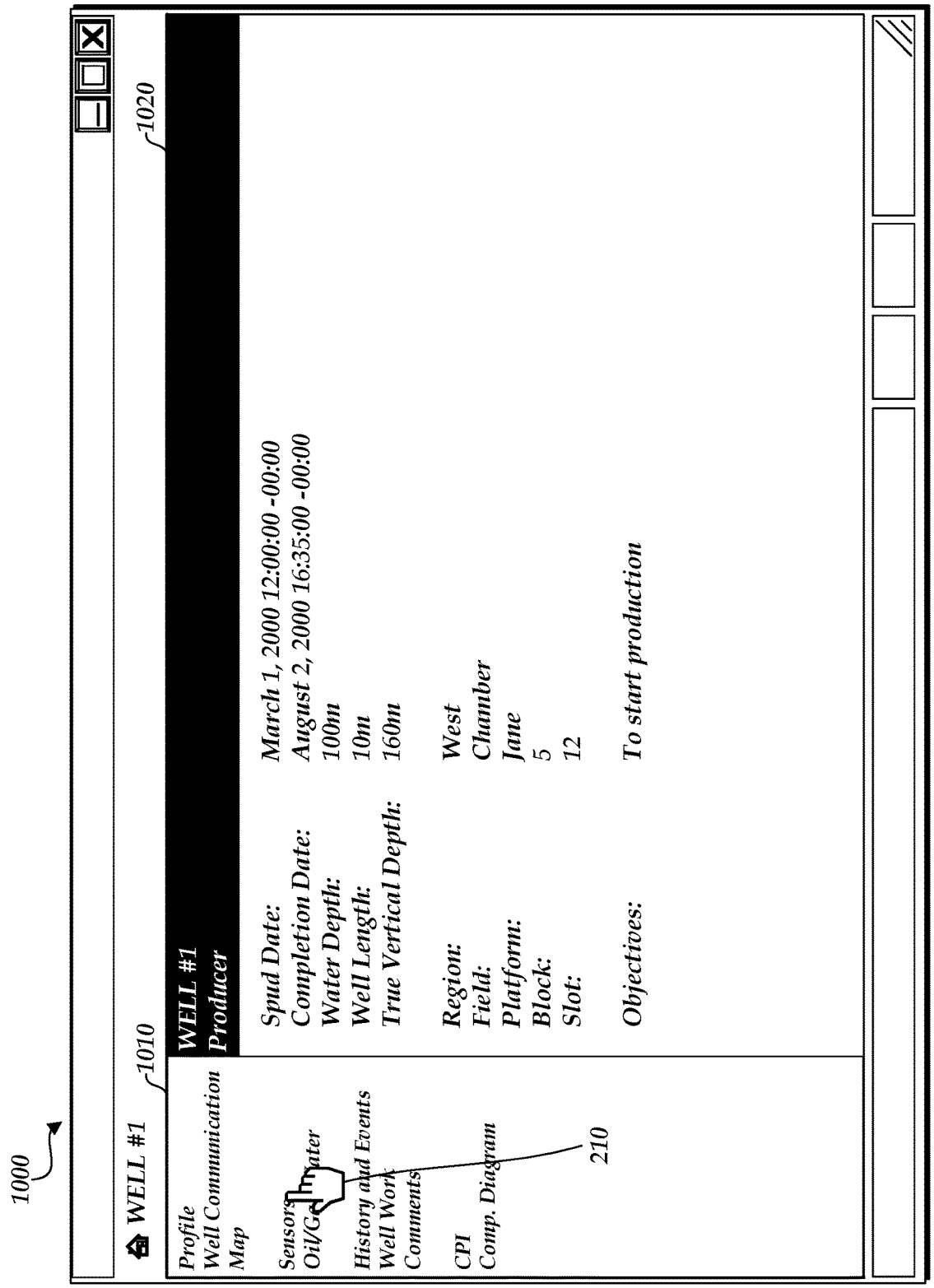

As illustrated in FIG. 10B, the user may select a sensors button in the window 1010 using the cursor 210. The sensors button may retrieve data measured by the various sensors of the oil well. For example, the data may be retrieved from databases associated with the system that the sensors are associated with, and the data may be displayed in time-series graphs, scatterplot graphs, and/or the like as described herein.

Figure 10C:
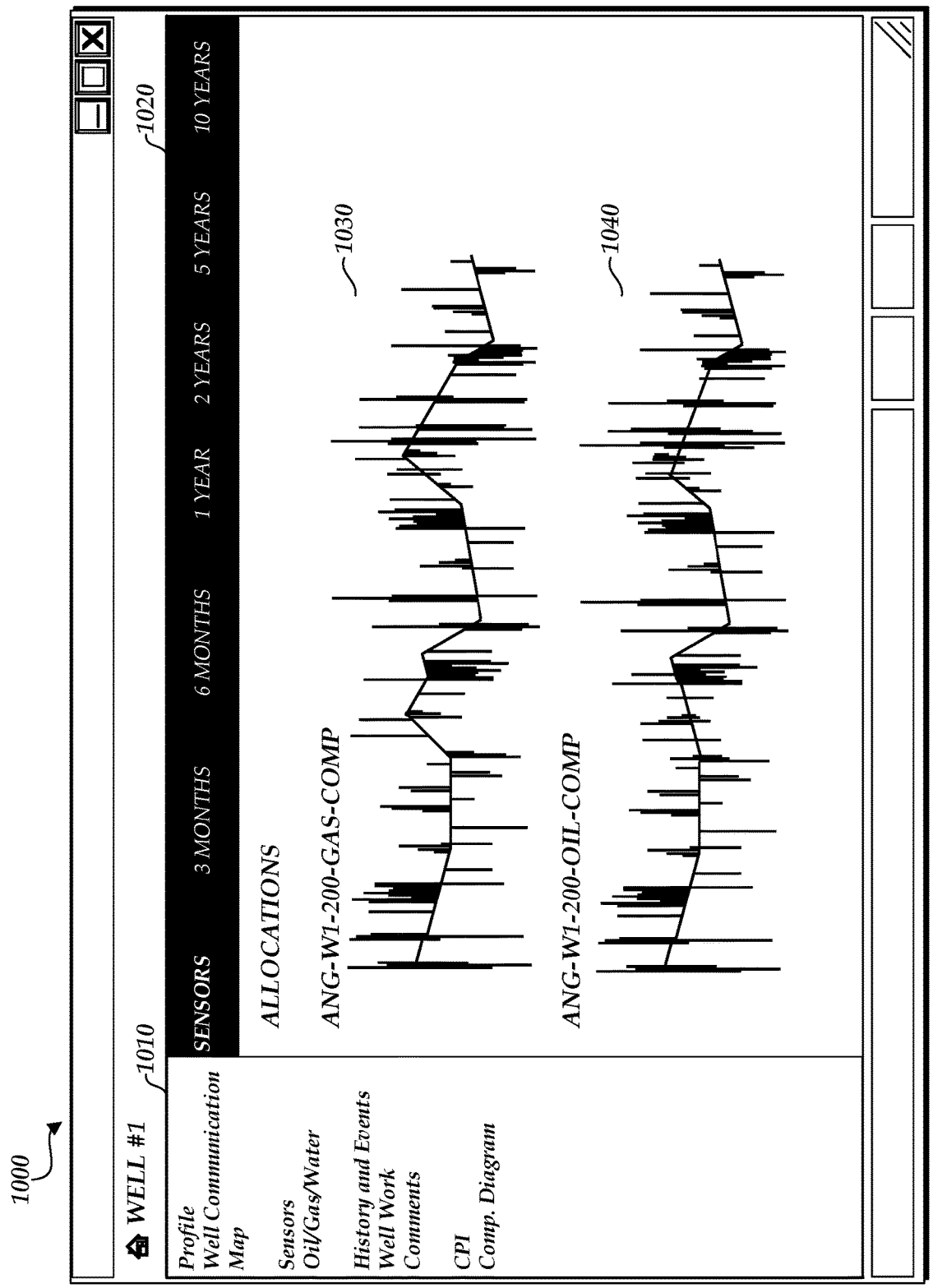

As illustrated in FIG. 10C, after the sensors button is selected, the window 1020 may display various time-series graphs 1030 and 1040. The time-series graphs 1030 and/or 1040 may be manipulated in any manner as described herein with respect to FIGS. 1 through 9E. In addition, the user interface 1000 may display any number of time-series graphs, each of which may be manipulated in the manners described herein. For example, several time-series graphs (e.g., three, four, five, or more graphs) may be concurrently displayed on one or more display devices, each with differing (or identical) timescales for the corresponding sensor data displayed. According to the systems and methods discussed above, a user may select a particular time or time period on one of the displayed time-series graphs and, in response to such selection, the system automatically selects corresponding time periods in each of the other time-series graphs.

Figure 10D:
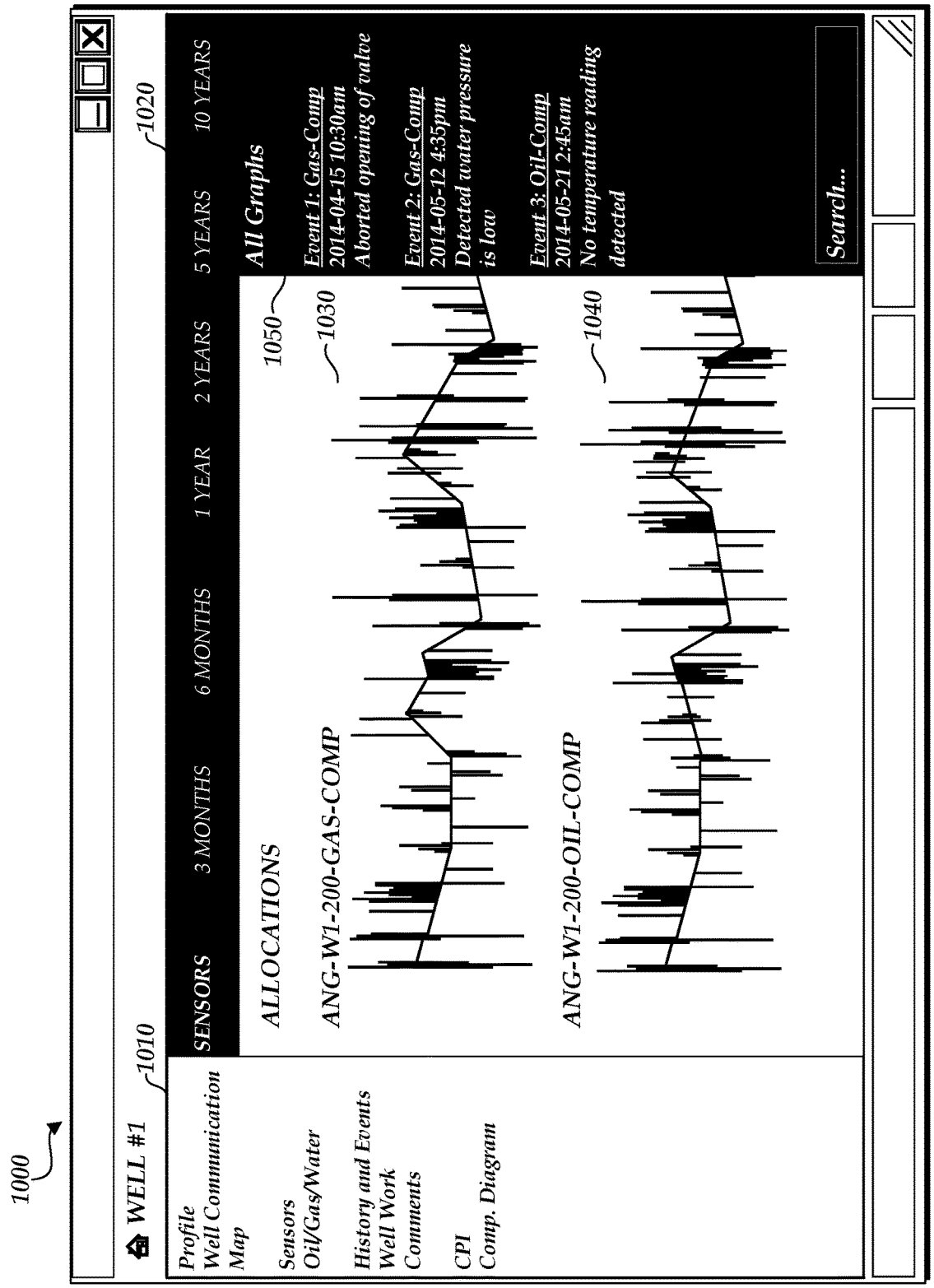

As illustrated in FIG. 10D, the user interface 1000 may also include an event information pane 1050 that provides event information for events that occurred and/or annotations that are related to the sensors that measured the data depicted in the time-series graphs 1030 and/or 1040.

Figure 11B:
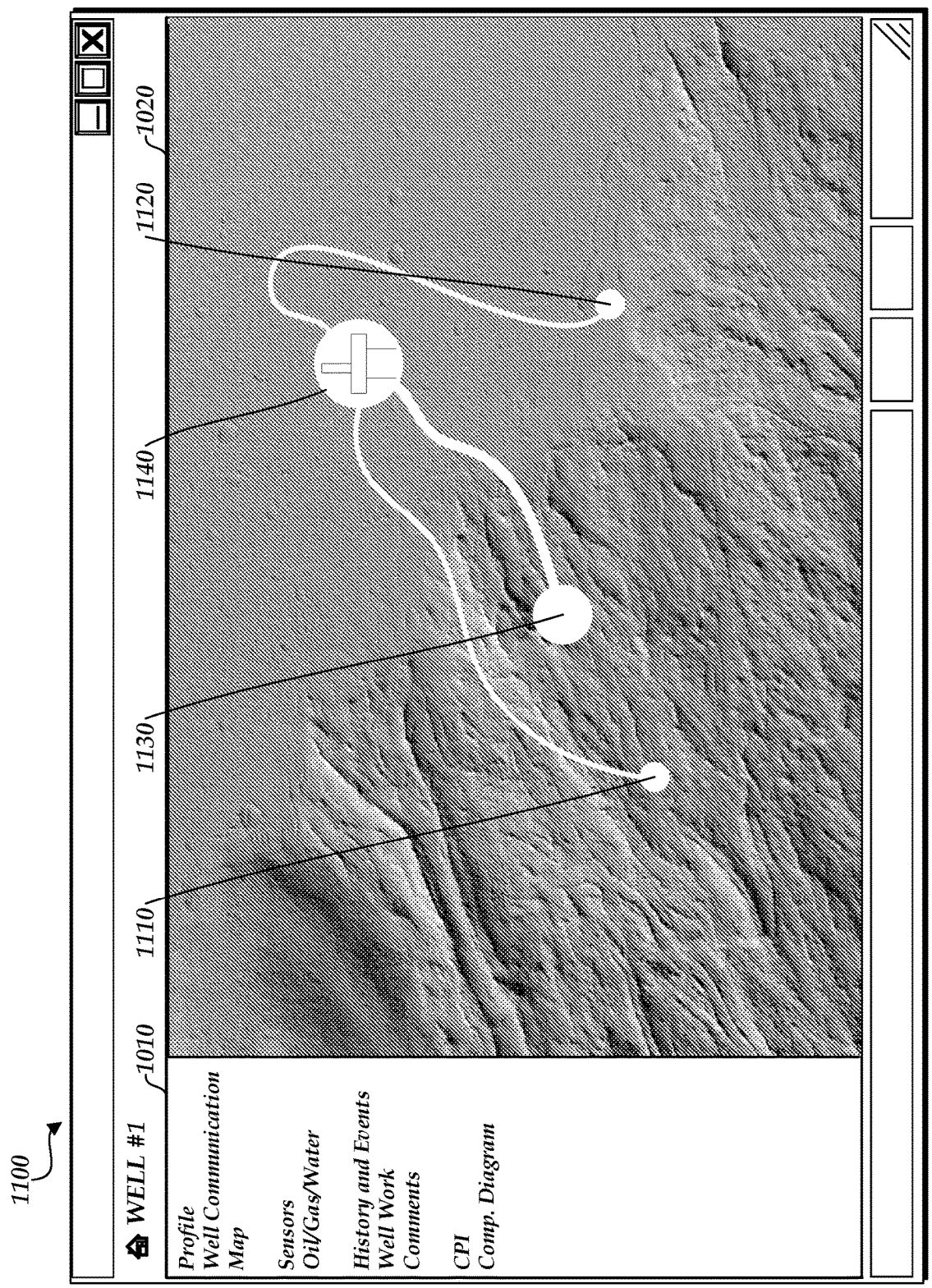

FIGS. 11A-11D illustrate another user interface 1100 that provides interactive information about an oil well. As illustrated in FIG. 11A, the user interface 1100 includes the windows 1010 and 1020. In an embodiment, the user selects a maps button in the window 1010.

As illustrated in FIG. 11B, once the maps button is selected, the window 1020 displays a map showing a location of an oil well 1140, injectors 1110 and 1120, producer 1130, and/or other related components (not shown).

Figure 11C:
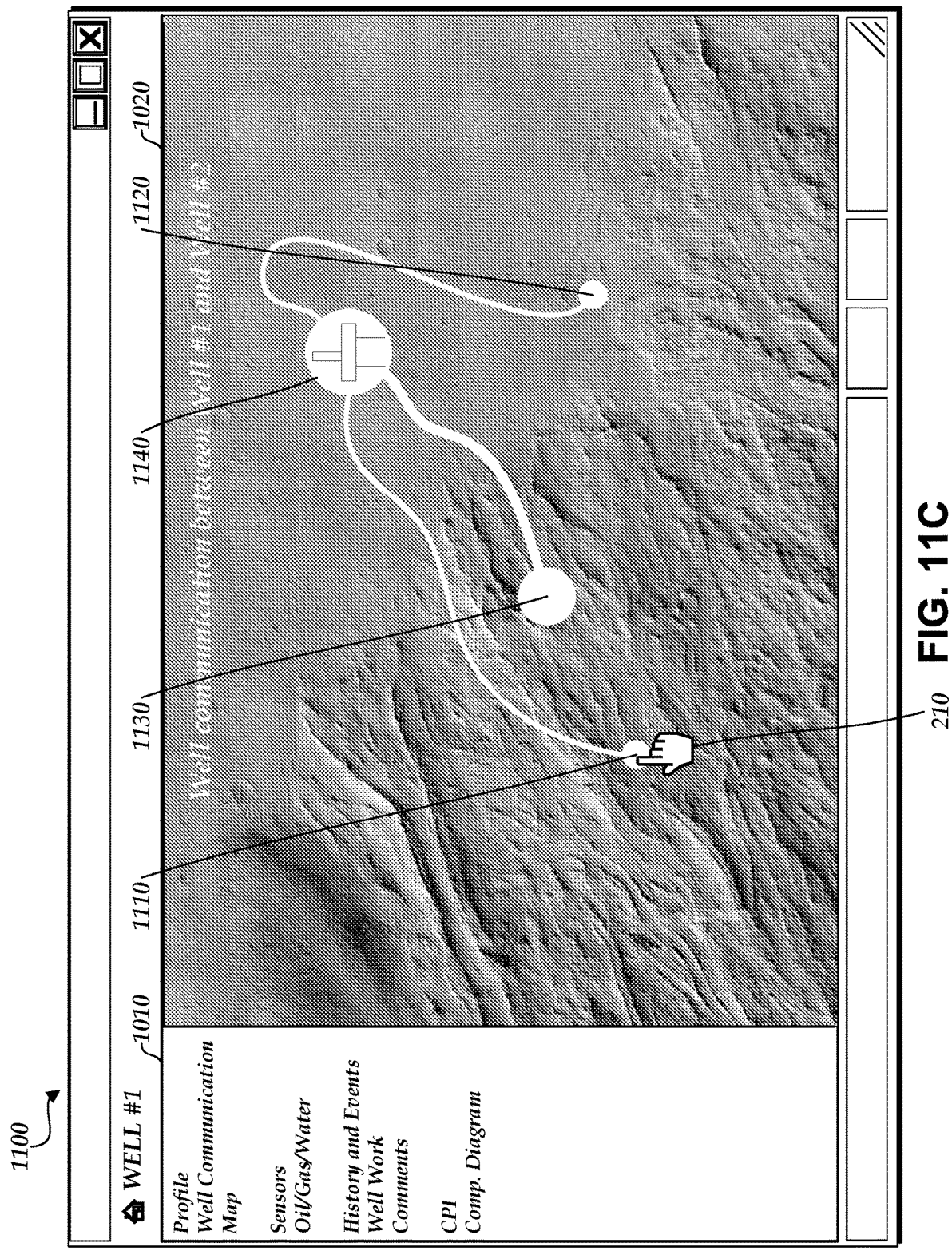

As illustrated in FIG. 11C, the user may hover and/or select one or more of the components depicted in the map to view more information. For example, the cursor 210 may hover over the injector 1110, which causes the user interface 1100 to display text associated with the injector 1110 in the window 1020 (e.g., "well communication between A01 and A1").

Figure 11D:

As illustrated in FIG. 11D, selecting a component may allow the user to view additional information about the component in the window 1020. For example, selection of the injector 1110 causes the user interface 1100 to provide more information about the injector 1110 (e.g., the injector's age, the injector's location, the injector's objectives, etc.). Furthermore, from the information displayed in FIG. 11D the user may select the sensors indicator in order to view one or more time-series graphs associated with sensor data of the selected component (a particular well in the example of FIG. 11D).

Figure 12:
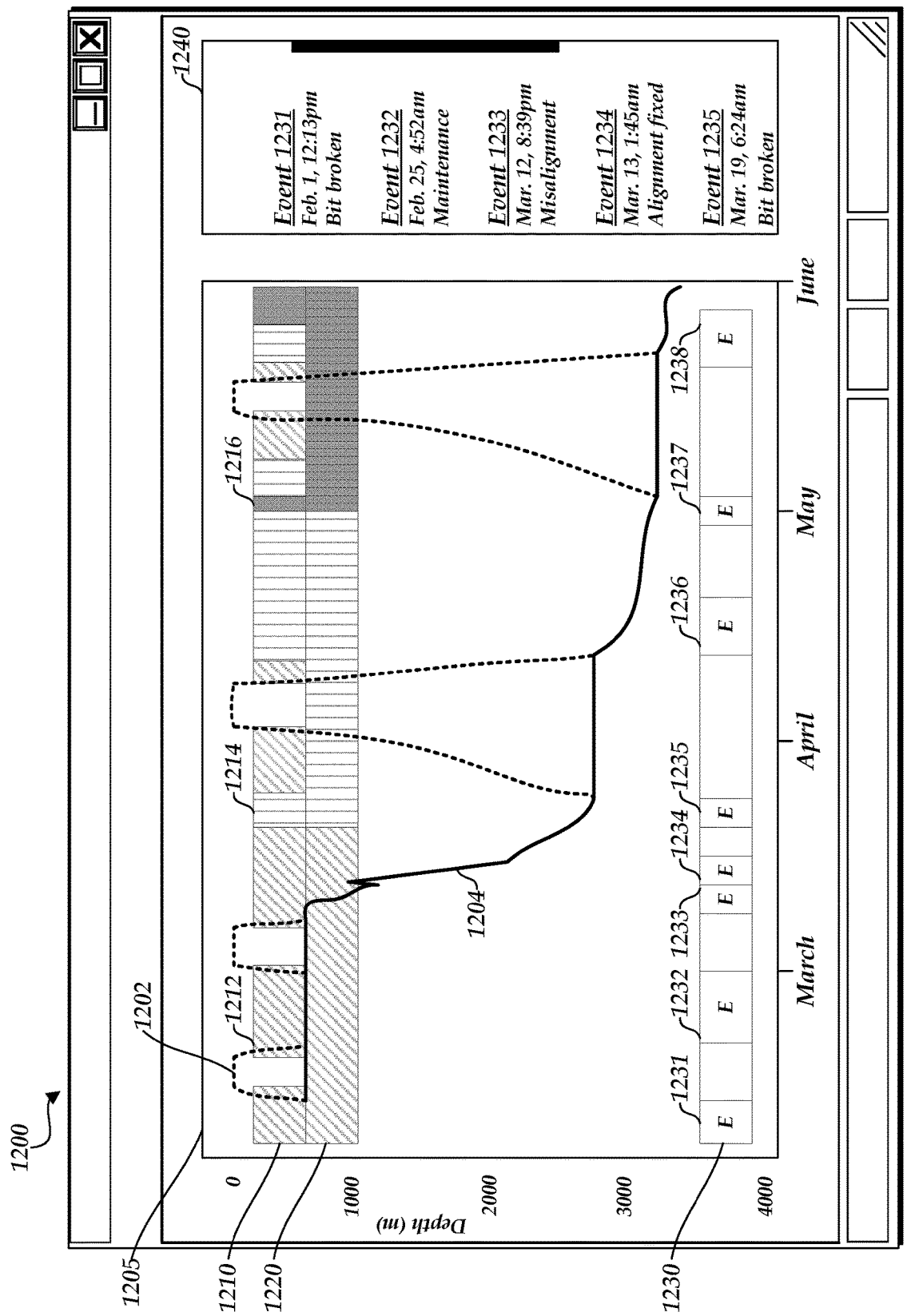
FIG. 12 illustrates another user interface that displays drill bit, hole depth, and rock layer information.

FIG. 12 illustrates another user interface 1200 that displays drill bit, hole depth, and rock layer information. As illustrated in FIG. 12, the user interface 1200 includes graph 1205 and window 1240. The graph 1205 may display a vertical position of an item (e.g., a drill bit) in an underground crevice or structure (e.g., an oil well) over a period of time in which a rock layer at the position of the item, a rock layer at the bottom of the underground crevice or structure (e.g., a hole depth), and/or events associated with the underground crevice or structure that have occurred during the period of time are indicated. For example, the graph 1205 may have an x-axis that represents time (e.g., in months), may have a y-axis that represents depth below the surface (e.g., in meters), and may display a vertical position of a drill bit in an oil well over a period of time. The graph 1205 may also display a rock layer at the position of the drill bit during the period of time, a rock layer at the bottom of the oil well during the period of time, and events associated with the oil well that occurred during the period of time.

As illustrated in FIG. 12, the graph 1205 includes a curve 1202 that represents a depth of the drill bit at each point in time. The graph 1205 further includes a curve 1204 that represents a depth of the bottom of the oil well at each point in time. For example, the drill bit may be used alone or as a part of a larger apparatus to drill into the ground to increase the depth of the oil well. Occasionally, the drill bit may be raised from the bottom of the oil well to the surface (e.g., to perform maintenance on the drill). Thus, the curve 1202 may rise and fall as drilling begins, ends, and restarts. However, the depth of the bottom of the oil well may not decrease (e.g., the depth may not decrease from 1000 m below the surface to 500 m below the surface) unless, for example, the hole in the oil well is filled in. Thus, the curve 1204 may remain static over time or continue to fall down along the y-axis.

Row 1210 identifies the different rock layers at a vertical position of the drill bit over time. For example, between February and mid-March, the drill bit may be at a depth that falls within rock layer 1212 (except for times in which the drill bit is at the surface, which is indicated by a blank space in the row 1210). After mid-March, the drill bit may briefly be at a depth that falls within rock layer 1214. However, prior to the beginning of April, the drill bit may be slowly raised to the surface. During this time, the drill bit may pass from the rock layer 1214 to the rock layer 1212 before reaching the surface, as indicated in the row 1210. Likewise, in May, the drill bit may reach a depth below the surface that falls within rock layer 1216, as indicated in the row 1210.

Row 1220 identifies the different rock layers at the bottom of the oil well over time. For example, the row 1220 may identify the deepest rock layer reached by the drill bit (assuming that the oil well is not filled in and that the deepest region reached by the drill bit corresponds with the depth of the bottom of the oil well). Thus, while the drill bit may be raised to the surface in mid-May, the row 1220 indicates that the rock layer 1216 is the rock layer at the depth of the bottom of the oil well.

Row 1230 identifies a time or time range at which various events 1231-1238 may have occurred in the period of time viewed within the graph 1205. Information on one or more of the events 1231-1238 may be provided in the window 1240. For example, the window 1240 may identify an event, a time that the event occurred, and/or a description of the event. Accordingly, a user may be able to identify times in which an oil well is not being drilled, reasons why such delays have occurred, and/or possible solutions for reducing such delays.

In further embodiments, not shown, additional data or curves can be included in the graph 1205. For example, a curve indicating levels of gamma radiation at the vertical position of the drill bit (e.g., a curve in which the y-axis value represents gamma radiation levels at the vertical position of the drill bit at a time instant and the x-axis value represents time), a curve indicating levels of gamma radiation at the bottom of the oil well (e.g., a curve in which the y-axis value represents gamma radiation levels at the bottom of the oil well at a time instant and the x-axis value represents time), a curve indicating levels of gamma radiation at a static or dynamic depth within the oil well (e.g., a curve in which the y-axis value represents gamma radiation levels at the static or dynamic depth and the x-axis value represents time), and/or the like may be included in the graph 1205.

Example Process Flow

Figure 13:
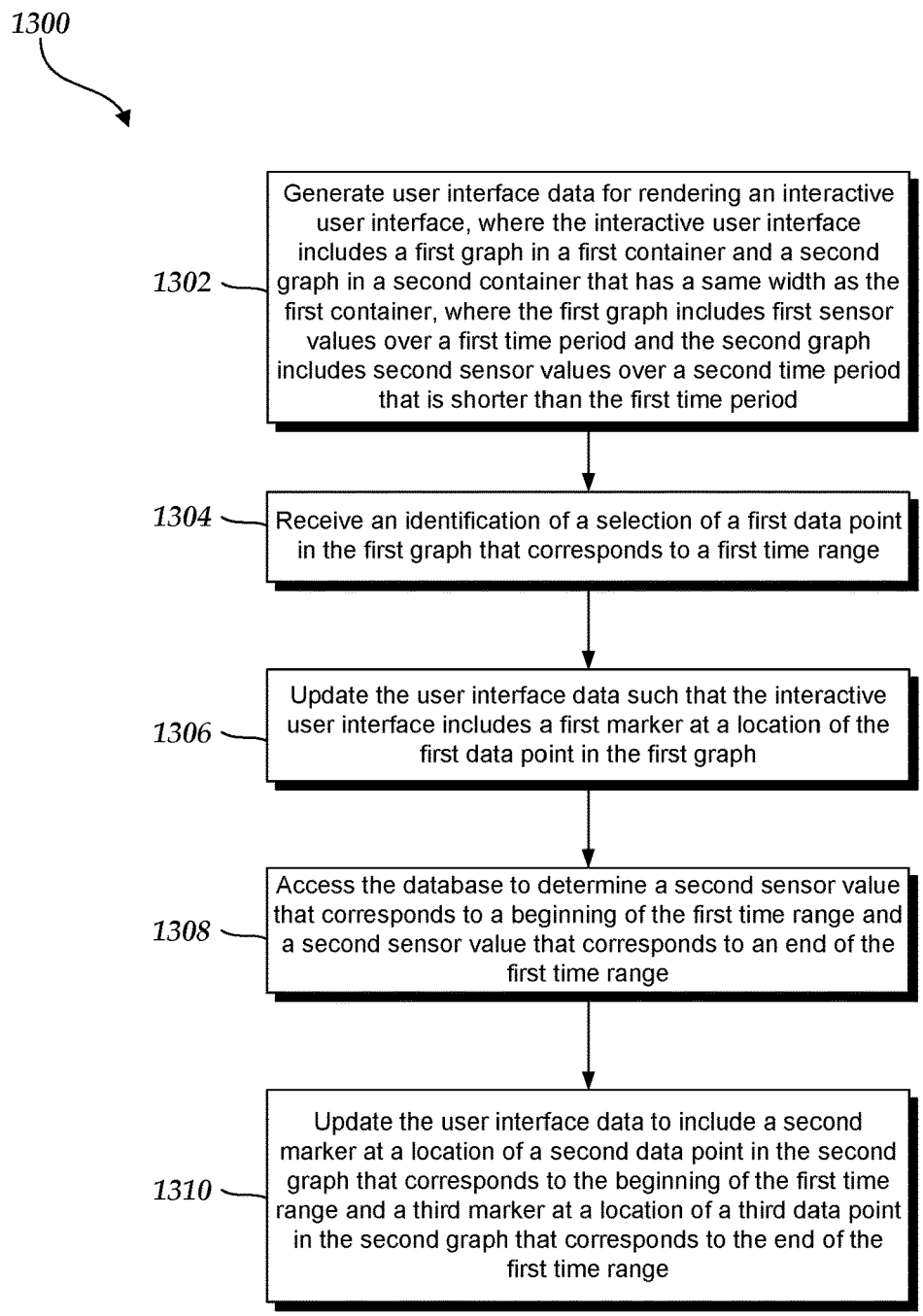
FIG. 13 is a flowchart depicting an illustrative operation of accessing one or more databases in substantially real-time in response to input from a user provided in an interactive user interface in order to determine information related to measured data points and provide the determined information to the user in the interactive user interface.

FIG. 13 is a flowchart 1300 depicting an illustrative operation of accessing one or more databases in substantially real-time in response to input from a user provided in an interactive user interface in order to determine information related to measured data points and provide the determined information to the user in the interactive user interface. Depending on the embodiment, the method of FIG. 13 may be performed by various computing devices, such as by the computing system 1400 described below. Depending on the embodiment, the method of FIG. 13 may include fewer and/or additional blocks and the blocks may be performed in an order different than illustrated. While the flowchart 1300 is described with respect to having sensor data depicting in graphs, this is not meant to be limiting. The illustrative operation depicting in the flowchart 1300 can be implemented on any type of time-series data from any source.

In block 1302, user interface data for rendering an interactive user interface is generated. The interactive user interface may include a first graph in a first container and a second graph in a second container that has a same width as the first container. The first graph may include first sensor values over a first time period and the second graph may include second sensor values over a second time period.

In block 1304, an identification of a selection of a first data point in the first graph that corresponds to a first time range is received. The first time range could be determined based on a time range that corresponds with each individual pixel in an x-axis.

In block 1306, the user interface data is updated such that the interactive user interface includes a first marker at a location of the first data point in the first graph. The marker may be a vertical line that is temporarily displayed in the interactive user interface.

In block 1308, the database is accessed to determine a second sensor value that corresponds to a beginning of the first time range and a second sensor value that corresponds to an end of the first time range. For example, the second sensor value that corresponds to a beginning of the first time range may be a sensor value that was measured at a time that corresponds with the beginning of the first time range.

In block 1310, the user interface data is updated to include a second marker at a location of a second data point in the second graph that corresponds to the beginning of the first time range and a third marker at a location of a third data point in the second graph that corresponds to the end of the first time range. Thus, the user may be able to view, within the interactive user interface, first sensor values and second sensor values that were measured at the same time.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 14:
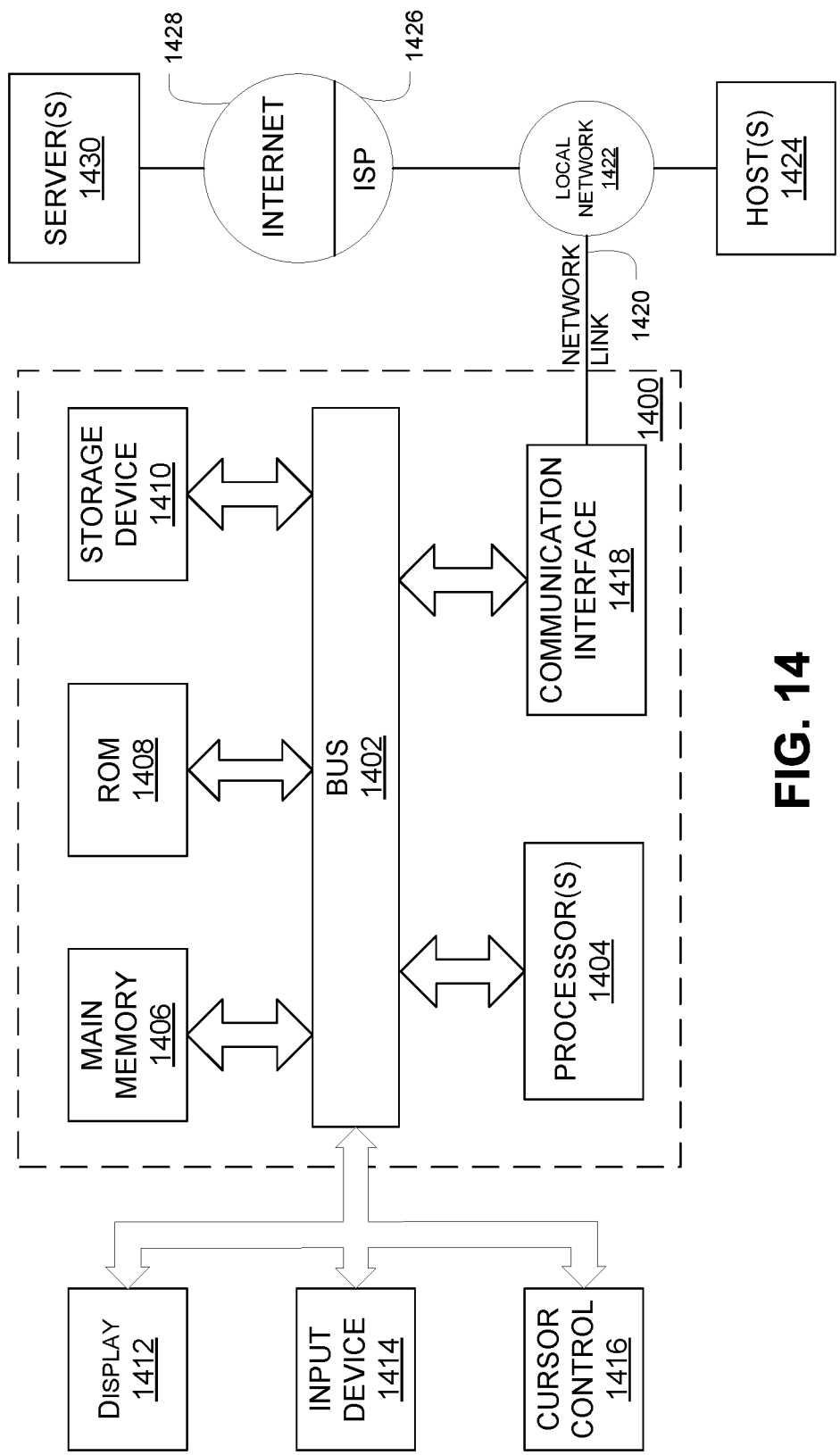
FIG. 14 illustrates a computer system with which certain methods discussed herein may be implemented, according to one embodiment.

For example, FIG. 14 is a block diagram that illustrates a computer system 1400 upon which an embodiment may be implemented. For example, any of the computing devices discussed herein may include some or all of the components and/or functionality of the computer system 1400.

Computer system 1400 includes a bus 1402 or other communication mechanism for communicating information, and a hardware processor, or multiple processors, 1404 coupled with bus 1402 for processing information. Hardware processor(s) 1404 may be, for example, one or more general purpose microprocessors.

Computer system 1400 also includes a main memory 1406, such as a random access memory (RAM), cache and/or other dynamic storage devices, coupled to bus 1402 for storing information and instructions to be executed by processor 1404. Main memory 1406 also may be used for storing temporary variables or other intermediate information during execution of instructions to be executed by processor 1404. Such instructions, when stored in storage media accessible to processor 1404, render computer system 1400 into a special-purpose machine that is customized to perform the operations specified in the instructions. Main memory 1406 may also store cached data, such as zoom levels and maximum and minimum sensor values at each zoom level.

Computer system 1400 further includes a read only memory (ROM) 1408 or other static storage device coupled to bus 1402 for storing static information and instructions for processor 1404. A storage device 1410, such as a magnetic disk, optical disk, or USB thumb drive (Flash drive), etc., is provided and coupled to bus 1402 for storing information and instructions. For example, the storage device 1410 may store measurement data obtained from a plurality of sensors.

Computer system 1400 may be coupled via bus 1402 to a display 1412, such as a cathode ray tube (CRT) or LCD display (or touch screen), for displaying information to a computer user. For example, the display 1412 can be used to display any of the user interfaces described herein with respect to FIGS. 1 through 12. An input device 1414, including alphanumeric and other keys, is coupled to bus 1402 for communicating information and command selections to processor 1404. Another type of user input device is cursor control 416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1400 may include a user interface module to implement and/or update (e.g., in response to the graph manipulations described herein) a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor(s) 1404 executing one or more sequences of one or more instructions contained in main memory 1406. Such instructions may be read into main memory 1406 from another storage medium, such as storage device 1410. Execution of the sequences of instructions contained in main memory 1406 causes processor(s) 1404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1410. Volatile media includes dynamic memory, such as main memory 1406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 406, from which processor 1404 retrieves and executes the instructions. The instructions received by main memory 1406 may retrieve and execute the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN (or WAN component to communicated with a WAN). Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution.

Terminology

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computing system comprising:
a computer processor; and
a computer readable storage medium storing program instructions configured for execution by the computer processor in order to cause a user interface module of the computing system to:
generate user interface data for rendering an interactive user interface on a computing device, the interactive user interface including a first graph, wherein the first graph includes a first curve that represents a vertical position of an item in an underground structure at a first time and a second curve that represents a depth of a bottom of the underground structure at the first time;
determine that drilling in the underground structure has begun at a second time after the first time; and
update the user interface data such that the interactive user interface includes an updated version of the first curve that represents an updated vertical position of the item in the underground structure at the second time.

2. The computing system of claim 1, wherein the first graph comprises an x-axis that represents time and a y-axis that represents depth below a surface.

3. The computing system of claim 1, wherein the first graph comprises an indication of a rock layer at the updated vertical position of the item.

4. The computing system of claim 1, wherein the first graph comprises an indication of a rock layer at the bottom of the underground structure at the first time and at the second time.

5. The computing system of claim 1, wherein the first graph comprises an indication of an event that occurred at the second time.

6. The computing system of claim 5, wherein the indication of the event comprises a description of a reason why a delay in drilling occurred at the second time.

7. The computing system of claim 1, wherein the first graph further includes a third curve that indicates one of a level of gamma radiation at the updated vertical position of the item, a level of gamma radiation at the bottom of the underground structure, or a level of gamma radiation at a static or dynamic depth within the underground structure.

8. The computing system of claim 1, wherein the item comprises a drill bit.

9. The computing system of claim 1, wherein the second curve represents a hole depth.

10. A computer-implemented method comprising:
generating, by a computing system comprising one or more processors, user interface data for rendering an interactive user interface on a computing device, the interactive user interface including a first graph, wherein the first graph includes a first curve that represents a vertical position of an item in an underground structure at a first time and a second curve that represents a depth of a bottom of the underground structure at the first time;
determining, by the computing system, that drilling in the underground structure has begun at a second time after the first time; and
updating, by the computing system, the user interface data such that the interactive user interface includes an updated version of the first curve that represents an updated vertical position of the item in the underground structure at the second time.

11. The computer-implemented method of claim 10, wherein the first graph comprises an x-axis that represents time and a y-axis that represents depth below a surface.

12. The computer-implemented method of claim 10, wherein the first graph comprises an indication of a rock layer at the updated vertical position of the item.

13. The computer-implemented method of claim 10, wherein the first graph comprises an indication of a rock layer at the bottom of the underground structure at the first time and at the second time.

14. The computer-implemented method of claim 10, wherein the first graph comprises an indication of an event that occurred at the second time.

15. The computer-implemented method of claim 14, wherein the indication of the event comprises a description of a reason why a delay in drilling occurred at the second time.

16. The computer-implemented method of claim 10, wherein the first graph further includes a third curve that indicates one of a level of gamma radiation at the updated vertical position of the item, a level of gamma radiation at the bottom of the underground structure, or a level of gamma radiation at a static or dynamic depth within the underground structure.

17. A non-transitory computer-readable medium comprising one or more program instructions recorded thereon, the instructions configured for execution by a computing system comprising one or more processors in order to cause the computing system to:

generate user interface data for rendering an interactive user interface on a computing device, the interactive user interface including a first graph, wherein the first graph includes a first curve that represents a vertical position of an item in an underground structure at a first time and a second curve that represents a depth of a bottom of the underground structure at the first time;

determine that drilling in the underground structure has begun at a second time after the first time; and update the user interface data such that the interactive user interface includes an updated version of the first curve that represents an updated vertical position of the item in the underground structure at the second time.

18. The non-transitory computer-readable medium of claim 17, wherein the first graph comprises an x-axis that represents time and a y-axis that represents depth below a surface.

19. The non-transitory computer-readable medium of claim 17, wherein the first graph comprises an indication of a rock layer at the updated vertical position of the item.

20. The non-transitory computer-readable medium of claim 17, wherein the first graph comprises an indication of a rock layer at the bottom of the underground structure at the first time and at the second time.

* * * * *